US008789077B2

(12) United States Patent
Hao et al.

(10) Patent No.: US 8,789,077 B2
(45) Date of Patent: Jul. 22, 2014

(54) METHOD AND SYSTEM FOR FACILITATING NETWORK CONNECTIVITY AND CONSUMPTION OF BROADBAND SERVICES

(75) Inventors: Jack Jianxiu Hao, Lexington, MA (US); Diego S. Rozensztejn, Brookline, MA (US); Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 557 days.

(21) Appl. No.: 12/645,733

(22) Filed: Dec. 23, 2009

(65) Prior Publication Data

US 2011/0154383 A1   Jun. 23, 2011

(51) Int. Cl.
*H04N 7/16* (2011.01)
*H04N 21/254* (2011.01)
*H04N 21/239* (2011.01)
*H04N 21/258* (2011.01)

(52) U.S. Cl.
CPC ....... *H04N 21/2541* (2013.01); *H04N 21/2396* (2013.01); *H04N 21/25816* (2013.01)
USPC ....... 725/8; 725/5; 725/31; 725/110; 725/131

(58) Field of Classification Search
CPC .......... H04N 21/2396; H04N 21/2541; H04N 21/25816

USPC ................... 725/5, 8, 31, 110, 131
See application file for complete search history.

(56) References Cited

U.S. PATENT DOCUMENTS

| | | | | |
|---|---|---|---|---|
| 5,852,812 A * | 12/1998 | Reeder | ........................... | 705/39 |
| 6,208,977 B1 * | 3/2001 | Hernandez et al. | ............. | 705/34 |
| 6,452,923 B1 * | 9/2002 | Gerszberg et al. | ............ | 370/352 |
| 7,289,489 B1 * | 10/2007 | Kung et al. | .................... | 370/352 |
| 2005/0028208 A1 * | 2/2005 | Ellis et al. | ........................ | 725/58 |
| 2007/0192807 A1 * | 8/2007 | Howcroft | ........................ | 725/86 |
| 2007/0288986 A1 * | 12/2007 | Candelore et al. | ............. | 725/132 |
| 2008/0055190 A1 * | 3/2008 | Lee | ................. | 345/2.1 |
| 2008/0120675 A1 * | 5/2008 | Morad et al. | ................... | 725/120 |
| 2008/0208715 A1 * | 8/2008 | Hod et al. | ........................ | 705/27 |
| 2008/0288996 A1 * | 11/2008 | Walter et al. | ................... | 725/131 |
| 2010/0217837 A1 * | 8/2010 | Ansari et al. | .................. | 709/218 |
| 2011/0277001 A1 * | 11/2011 | Kaluskar et al. | ................ | 725/80 |

* cited by examiner

*Primary Examiner* — Pankaj Kumar
*Assistant Examiner* — Sahar Baig

(57) ABSTRACT

An approach is provided to facilitate network connectivity and consumption of broadband services. A data network connection is established by a set-top box. Sharing of the data network connection by a plurality of user devices is permitted by the set-top box. A credit count is maintained based on the sharing of the data network connection by the plurality of user devices.

18 Claims, 13 Drawing Sheets

US 8,789,077 B2

METHOD AND SYSTEM FOR FACILITATING NETWORK CONNECTIVITY AND CONSUMPTION OF BROADBAND SERVICES

BACKGROUND INFORMATION

With the advent of computers, interactive electronic communications, and the Internet, as well as advances in the digital realm of consumer information, has come a reinvention of conventional entertainment and the emergence of new broadband services to enhance programming, recording, and viewing of multimedia, such as broadcast television programs. This evolution has also served as a catalyst to a growing reliance on digital interfaces, so much so, that media devices, such as set-top boxes (STB), have become ubiquitous for enabling media content accessibility. Even still, given the highly competitive nature of the telecommunications industry, service providers are relying now, more than ever, on robust network availability as a key differentiator in delivering data, voice, and video services. Further, as consumers grow more loyal, service providers seeking to maximize average revenue per subscriber are becoming more acutely dependent upon techniques to entice and incentivize increased adoption and consumption of available and emerging broadband services.

Therefore, there is a need for an approach to facilitate network connectivity and consumption of broadband services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for facilitating network connectivity and consumption of broadband services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to set-top boxes, it is contemplated that various embodiments are also applicable to other devices capable of processing audio-video signals, such as home communication terminals, digital home communication terminals, stand-alone personal video recorders, television sets, digital video disc players, audio-video enabled mobile terminals, audio-video enabled personal digital assistants, personal computers, etc., as well as other like technologies and customer premise equipment.

Figure 1:
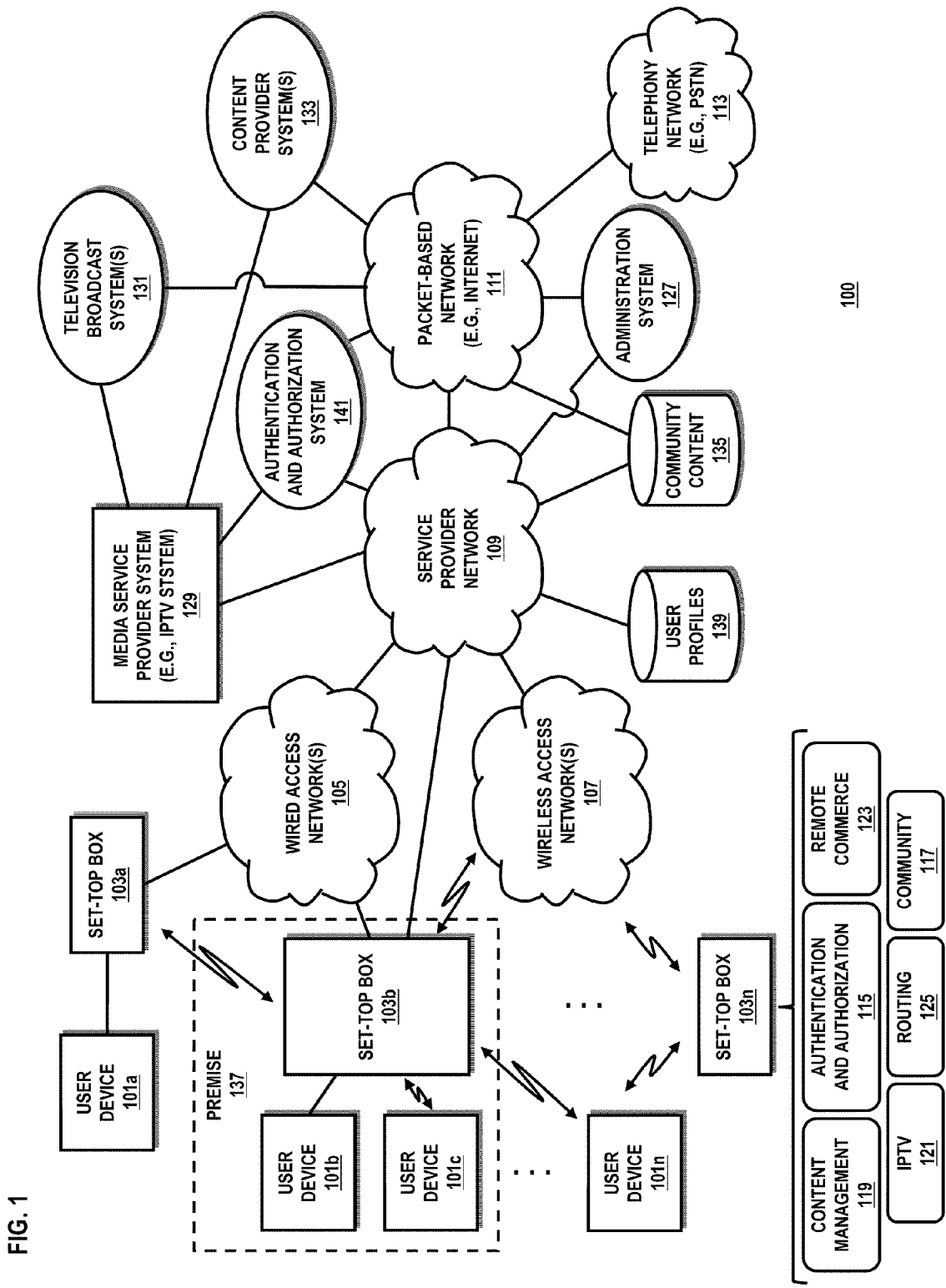
FIG. 1 is a diagram of a system configured to facilitate network connectivity and consumption of broadband services, according to an exemplary embodiment.

FIG. 1 is a diagram of a system configured to facilitate network connectivity and consumption of broadband services, according to an exemplary embodiment. For the purposes of illustration, system 100 is described with respect to a data communication infrastructure (e.g., an internet protocol-based infrastructure) configured to provide subscribers (or users) at one or more user devices 101*a*-101*n* with voice, video, and/or data services via one or more set-top boxes 103*a*-103*n*. In this manner, set-top boxes 103*a*-103*n* are configured to establish data network connections with one or more wired access networks 105 and/or wireless access networks 107 for providing user devices 101*a*-101*n* with connectivity to service provider network 109 and, as a result, one or more broadband services provided via service provider network 109 and/or one or more packet-based networks 111, such as the Internet. It is noted that any one of set-top boxes 103*a*-103*n* may be additionally (or alternatively) linked directly to service provider network 109, such as shown with set-top box 103*b*, and/or packet-based network 111. Service provider network 109 may further enable access to (or communications over) one or more telephony networks, e.g., telephony network 113. Accordingly, set-top boxes 103*a*-103*n* may be configured to permit one or more user devices (e.g., user devices 101*b*-101*n*) to share established data network connections of set-top boxes 103*a*-103*n*, which may be either wired data network connections or wireless data network connections and, as such, may be supported via any suitable transport medium, e.g., one or more wired mediums, such as twisted pair, coaxial cable, optical cable, etc., or one or more wireless mediums, such as microwave, radio, satellite, etc. As such, one or more incentive based reward systems may be instituted by a service provider of system 100 in order to encourage sharing of established data network connections, such as an incentives-based credit count scheme whereby, for example, a subscriber who permits "visiting" users to share an established data network connection associated with the subscriber, may earn credit based on those "visiting" users who, in fact, avail themselves of the shared data network connection. In exemplary embodiments, earned credits may be utilized by the subscriber to freely share established data network connections of other set-top box subscribers, to redeem for billing credits or direct monetary compensation, to earn trial-use of select broadband services, and like. Accordingly, these shared data network connections also promote consumption of broadband services or, at least, make it easier for and more likely that subscribers and "visiting" users will consume broadband services, even when these consumers are "on the go." While specific reference will be made hereto, it is contemplated that system 100 may embody many forms and include multiple and/or alternative components and facilities.

It is recognized that, even with the advent of computers, high-speed data network connections, and the Internet, television remains the prevalent global medium for entertainment and information. Television users continue to be presented with an ever increasing amount and variety of programming choices. For instance, it is not uncommon for television users to have access to hundreds, if not thousands, of programming channels dedicated to any of a number of subjects. In fact, as traditional television programming (e.g., "over-the-air" programming, cable programming, satellite programming, etc.) merges with the networked content space (e.g., network-streamed content, on-demand content, Internet programming, media-sharing websites, etc.), the available programming choices are, more likely than not, only going to continue to grow more numerous and comprehensive. For instance, internet protocol television (IPTV) service providers offer subscribers various video services ranging from multi-channel video programming that mimics traditional broadcast television, to true video-on-demand (VOD) programming. These services may also be supplemented with interactive applications that enable robust programming content, communications, selection, and navigational functionalities, as well as integrated digital video recording and data services to enhance the video experience. In fact, these shared protocols create integrated value propositions with regard to accessible content.

As previously mentioned, however, the telecommunications industry is wrought with cut-throat competition, which has grown even more aggressive as the marketplace continues to envelop and become increasingly more integrated with other industries. Further, as existing consumers grow more loyal and the available pool of new customers diminishes, financially conscious service providers are looking for cost-effective solutions that not only leverage existing infrastructures, but also entice and incentivize increased adoption and consumption (or usage) of available and emerging services. This is a daunting challenge, especially given the fact that consumers are becoming physically more itinerant and, thereby, increasingly less available to consume traditionally "couch-potato" dependent services. As a result, conventionally stationary television-based technologies and services are being threatened and, therefore, must adapt to become more amendable to modern lifestyles. Thus, it is apparent that improvements are needed to increase consumption of available and emerging broadband services, which comes with added burden of not only increasing network availability, but also making such connectivity accessible to mobile consumers.

According to exemplary embodiments, set-top boxes 103a-103n may provide various functions as part of facilitating network connectivity and consumption (or usage) of one or more broadband data, voice, and/or video services, such as one or more authentication and authorization functions 115, community functions 117, content management functions 119, IPTV functions 121, remote commerce functions 123, and routing functions 125. Accordingly, functions 115-125 may be facilitated via one or more of networks 105-113 that, in exemplary embodiments, are internet protocol (IP) based networks. System 100 may also include administration system 127 for operational and management functions to deploy the broadband data, voice, and/or video services using, for example, a media service provider (MSP) system 129. According to exemplary embodiments, MSP system 129 may provide (in addition to content associated with a service provider of the broadband data, voice, and/or video services of system 100) content obtained from one or more "other" sources, such as one or more television broadcast systems 131, one or more third-party content provider systems 133, or content residing in a community content repository 135, as well as available via over one or more of networks 105-113, such as content stored to one or more set-top boxes 103a-103n, user devices 101a-101n, etc. In this manner, content broadly includes any audio-visual content (e.g., broadcast television programs, VOD programs, pay-per-view programs, IPTV feeds, DVD related content, etc.), pre-recorded content, data communication services content (e.g., commercials, advertisements, videos, movies, songs, images, sounds, etc.), Internet services content (streamed audio, video, or pictographic content), and/or any other equivalent content form. It is contemplated, however, that content may also take on any type of information provided from any source having connectivity with system 100.

In this manner, content management function 119 may embody one or more user interfaces capable of local implementation on a set-top box 103a-103n or on a user device 101a-101n and, thereby, interface with set-top boxes 101a-101n. Thus, exemplary embodiments of these user interfaces may be provided through navigation shell applications, e.g., menu applications having options corresponding to different functions, such as one or more of functions 115-125. As such, content management function 119 may be realized through one or more of these user interfaces, so as to permit users to easily, effectively, and intuitively locate and specify content accessible over one or more of network 105-113, such as for consuming, sharing, purchasing, and/or other like tasks. In other embodiments, one or more of these user interfaces may be employed in association with community function 117 to upload, download, and/or share content via community content repository 135. As such, embodiments of service provider network 109 may also enable individuals utilizing set-top boxes 101a-101n to interact with one another, through personalized communications channels, to further facilitate the processes described herein.

According to various embodiments, routing function 125 may be utilized for establishing data network connections over one or more of networks 105-113 that may be shared by one or more user devices 101a-101n and/or one or more set-top boxes 103a-103n. As such, routing function 125 may be employed to process data received on "external" data network connections (or links), such as data received from service provider network 109 in association with one or more broadband services, for transmission over an "internal" data network connection, e.g., over links from set-top boxes 103a-103n to one or more user devices 101a-101n or "other" set-top boxes 103a-103n. It is also noted that the converse may be true, i.e., the routing function 125 may be utilized to process data received on "internal" data network connections, e.g., data received from user devices 101a-101n or "other" set-top boxes 103a-103n in association with one or more broadband services, for transmission over an "external" data network connection, such as over one or more of networks 105-113. Routing function 125 is described in more detail with the routing engine of FIG. 2.

It is noted, however, that community function 117 may also be employed to permit a subscriber to share one or more data network connections associated with their set-top box (e.g., set-top box 103b) with a plurality of user devices (e.g., user devices 101b, 101c, and 101n) and/or "other" set-top boxes, e.g., set-top box 103a. In this manner, community function 117 may be configured to monitor the sharing of the data network connections, such that one or more credit counts may be maintained for the subscriber and/or subscribers associated with "visiting" user device 101n and "other" set-top box 103a. According to certain embodiments, the credit count may be maintained based on usage (or consumption) of bandwidth allotted to the subscriber and, thereby, shared with "visiting" users associated with user device 101n and/or set-top box 103a. As such, the credit count may be positively incremented when "visiting" users unassociated with the subscriber account of the subscriber consume bandwidth allotted to the subscriber. The credit count may be negatively incremented when the subscriber consumes bandwidth allotted to data network connections of other set-top box subscribers, or otherwise redeems credits associated with the credit count. In this way, system 100 not only facilitates network connectivity, but also incentivizes the sharing of data network connections. Such an approach also facilitates consumption of broadband services.

As shown in FIG. 1, service provider network 109 integrates the television medium with that of the telecommunications, computing, and media environments, thereby broadening the scope of access networks, devices, media sources, and offered services that are available to individuals for obtaining network connectivity and consuming broadband services, including programming and/or streaming content. In this manner, system 100 relieves network operators from the burden and expense of providing parallel avenues to these services and content, by enabling users, via user equipment (e.g., set-top boxes 103a-103n and/or user devices 101a-101n), to receive programming content accessible over a variety of traditional transmission systems (e.g., broadcast, coaxial cable, satellite, fiber optic cable) and/or over one or more data networks (e.g., packet-based network 109).

In the depicted embodiment, a plurality of set-top boxes 103a-103n are configured to communicate with and receive signals and/or data streams from a media service provider (MSP) system 129 or other transmission facility. Set-top boxes 103a-103n can be located at one or more user sites (e.g., premise 137) that may be geographically associated with one or more continents, countries, states, counties, municipalities, localities, communities, etc. Exemplary MSP systems 129 may comprise one or more media content servers (not illustrated) and/or data repositories. Alternatively, the servers and/or repositories may be accessed via one or more service provider networks 109 or packet-based networks 111, such as user profile repository 139 and/or community content repository 135. Further, a service provider network 109 may include a system administrator 127 for operational and management functions to deploy the broadband services of system 100 using, for instance, an internet protocol television (IPTV) system. In this manner, set-top boxes 103a-103n may utilize any appropriate technology to draw, receive, or transmit content from/to an MSP 129 or other content source/sink, such as user devices 101a-101n. According to certain embodiments, IPTV system 129 may receive content from one or more television broadcast systems 131, one or more third-party content provider systems 133, and/or one or more community content repositories 135. Selective or otherwise controlled access to the features and functionality of system 100 may be provided via authentication and authorization system 141 in conjunction with information stored to one or more user profile repositories 139. It is noted that a more detailed explanation of an exemplary set-top box is provided with FIG. 2.

In this manner, the use of IP permits television services to be integrated with broadband Internet services, and thus, share common connections to a user site, such as premise 137. Also, IP packets can be more readily manipulated, and therefore, provide users with greater flexibility in terms of control and offers superior methods for increasing the availability of content and/or broadband services. Delivery of video content, by way of example, may be through a multicast from the IPTV system 129 to STBs 103a-103n. Any individual set-top box may tune to a particular source, e.g., channel, by simply joining a multicast of the video content, utilizing an IP group membership protocol (IGMP). For instance, the IGMP v2 protocol may be employed for joining set-top boxes to new multicast groups. Such a manner of video delivery avoids the need for expensive tuners to view television broadcasts; however, other video delivery methods, such as directly modulated carriers (e.g., national television systems committee (NTSC), advanced television systems committee (ATSC), quadrature amplitude modulation (QAM)), may still be used. It should be noted that conventional delivery methods may still be implemented and combined with the advanced methods of system 100. Also, the video content may be provided to various IP-enabled devices, such as user devices 101a-101n.

According to exemplary embodiments, however, set-top boxes 103a-103n and, thereby, user devices 101a-101n may communicate using wired access network 105, wireless access network 107, service provider network 109, packet-based network 111, and/or telephony network 113. These networks 105-113 can include: a public data network (e.g., the Internet), various intranets, local area networks (LAN), wide area networks (WAN), the public switched telephone network (PSTN), integrated services digital networks (ISDN), private branch exchanges (PBX), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, code division multiple access (CDMA) networks, enhanced data rates for global evolution (EDGE) networks, general packet radio service (GPRS) networks, mobile ad hoc network (MANET) networks, global system for mobile communications (GSM) networks, Internet protocol multimedia subsystem (IMS) networks, universal mobile telecommunications system (UMTS) networks, worldwide interoperability for microwave access (WiMAX) networks, wireless fidelity (WiFi) networks, other wireless networks (e.g., wireless broadband networks, mobile television networks, radio networks, etc.), terrestrial broadcasting networks, provider specific networks, and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like.

Although depicted as separate entities, networks 105-113 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 105-113 may include components and facilities to provide for signaling and/or bearer communications between the various components or facilities of system 100. In this manner, networks 105-113 may embody or include portions of a signaling system 7 (SS7) network, or other suitable infrastructure to support control and signaling functions. As such, the conjunction of networks 105-113 may be adapted to provide the services of system 100.

According to various embodiments, service provider network 109 may include one or more video processing modules (not shown) for acquiring and transmitting video feeds from television broadcast systems 131 and/or other third-party content provider systems 133 over one or more of the networks 105-113 to particular set-top boxes 103a-103n and/or user devices 101a-101c. In this manner, service provider network 109 may include facilities to support compression/decompression, coding/decoding, modulation/demodulation, optical/electrical conversion, and analog/digital conversion, as well as any other suitable signal processing and/or transmission operation. In this manner, service provider network 109 and, thereby, set-top boxes 103a-103n may optionally support end-to-end data encryption in conjunction with various ones of the data, voice, and/or video services (e.g., video streaming services) of system 100, such that only authorized users are permitted to access and interact with these services and/or other legitimate users and sources.

In certain embodiments, authentication and authorization system 141 may be configured to perform authorization and authentication services and determine whether set-top boxes 103a-103n, content sources, and/or service providers are indeed subscribers to, or providers of, the broadband services of system 100. An authentication schema might require certain credential information, such as a username and password, one or more key access numbers, a unique machine identifier (e.g., media access control (MAC) address, globally unique identifier (GUID), organizationally unique identifier (OUI), content dependent identifier (CDI), extended unique identifier (EUI), serial number, etc.), one or more asymmetric authentication codes, and the like, as well as combinations thereof. In other instances, exemplary credential information may include any one or combination of a birth date, an account number (e.g., bank, credit card, billing code, limited use transactional account number, etc.), a social security number (SSN), an address (e.g., work, home, internet protocol (IP), MAC address, port, etc.), or telephone listing (e.g., work, home, cellular, etc.), as well as any other form of uniquely identifiable datum, e.g., bearer tag identifier, biometric code, voice print, etc. As such, authentication and authorization system 141 may be in communication with one or more user profiles repositories (e.g., user profile repository 139), which at least stores user credential information and/or other personalized information for use in association with the services of system 100, such as subscription information, billing information, configuration information, credit count information, public key/private key association information, and the like.

According to various exemplary embodiments, set-top boxes 103a-103n may be provisioned in association with the services of system 100 by associating respective device identifiers of corresponding set-top boxes 103a-103n with respective subscriber accounts, wherein subscriber accounts identify, for example, those user devices 101a-101n and/or set-top boxes 103a-103n associated with the corresponding subscriber accounts. Additionally or alternatively, set-top boxes 103a-103n may be authenticated utilizing one or more symmetric or asymmetric authentication schemes and, thereby, may be facilitated through one or more hashing functions, issuing and revoking various sets of digital certificates, and/or other like authentication and authorization schemes.

In certain instances, authentication procedures association with a first device corresponding to a particular subscriber account (e.g., set-top box 103b) may be utilized to identify and authenticate one or more devices associated with the subscriber account (e.g., user devices 101b and 101c) and/or one or more devices unassociated with the subscriber account (e.g., user device 101n or set-top box 103a) communicatively coupled to, or associated with, the first device. As such, once a particular set-top box (e.g., set-top box 103b) has authenticated a presence in association with the services of system 100, users and/or user devices 101a-101n accessing the services of system 100 through the particular set-top box may bypass (or otherwise not require) additional authentication and authorization procedures typically associated with these services, such as authentication and authorization procedures typically required in association with executing later applications (e.g., streaming applications, content on demand applications, etc.), downloading and uploading content to one or more networked repositories (e.g., user profiles repository 139, community content repository 135, etc.), participating in remote commerce sessions, etc. Further, once a particular set-top box (e.g., set-top box 103b) has authenticated a presence in association with the services of system 100, communications between those user devices in communication with the particular set-top box (e.g., user devices 101b-101n) and the broadband services, content sources, and/or repositories corresponding to service provider network 109 may be established directly, such that content, data, information, etc., exchanged between these services/entities may be trusted. Data packets, such as cookies, may be utilized for this purpose. As such, the authentication and authorization schemes of system 100 enable users at user devices 101a-101n to initiate secure sessions through any given, authenticated set-top box 103a-103n, whether or not the set-top box is associated with that individual user or user device. It is noted, however, that set-top boxes 103a-103n may be utilized to authenticate and authorize individual users and/or user devices 101a-101n. While not necessary, such an approach may be implemented to reduce the authorization and authentication demands typically imposed on authentication and authorization systems, such as authentication and authorization system 141. An exemplary process for authenticating a set-top box with the services of system 100 is explained in more detail with FIG. 5.

According to exemplary embodiments, user devices 101a-101n may include any form or type of customer premise equipment (CPE) capable of sending and/or receiving information over one or more of networks 105-113, such as one or more computing devices, mobile devices, and/or voice terminals. For instance, voice terminals may be any suitable plain old telephone service (POTS) device, facsimile machine, etc., whereas mobile devices may be any cellular phone, radiophone, satellite phone, smart phone, wireless phone, or any other suitable mobile device, such as a personal digital assistant (PDA), pocket personal computer, tablet, customized hardware, etc. Further, computing devices may be any suitable computing device, such as a "voice over" phone (e.g., voice over asynchronous transfer mode phone, voice over frame relay phone, voice over internet protocol phone, etc.), skinny client control protocol (SCCP) phone, session initiation protocol (SIP) phone, internet protocol phone, personal computer, softphone, workstation, terminal, server, customized hardware, etc. Additionally or alternatively, user devices 101a-101n may include any form or type of CPE capable of facilitating usage of broadband services made available over one or more of networks 105-113, such as one or more service-based devices, e.g., audio-visual devices, gaming devices, media devices, navigational devices, radio devices, recording devices, telephony devices, etc., as well as one or more of the aforesaid computing devices, mobile devices, and/or voice terminals including such function(s).

It is also contemplated that the physical implementation of repositories 135 and 139 may take on many forms, including, for example, portions of existing repositories of a service provider, new repositories of a service provider, third-party repositories, and/or shared-repositories. As such, repositories 135 and 139 may be configured for communication over system 100 via any suitable messaging protocol, such as lightweight directory access protocol (LDAP), extensible markup language (XML), open database connectivity (ODBC), structured query language (SQL), and the like, as well as combinations thereof. In those instances when repositories 135 and 139 are provided in distributed fashions, information and content available via repositories 135 and 139 may be located utilizing any suitable querying technique, such as electronic number matching, distributed universal number discovery (DUNDi), uniform resource identifiers (URI), etc.

Accordingly, a set-top box (e.g., set-top box 103a) may integrate all the functions of an IPTV system, as well as one or more authentication and authorization functions 115, community functions 117, content management functions 119, remote commerce functions 123, and routing functions 125 of various online and/or off-line environments, in a manner that seamlessly toggles among these functions.

Figure 2:
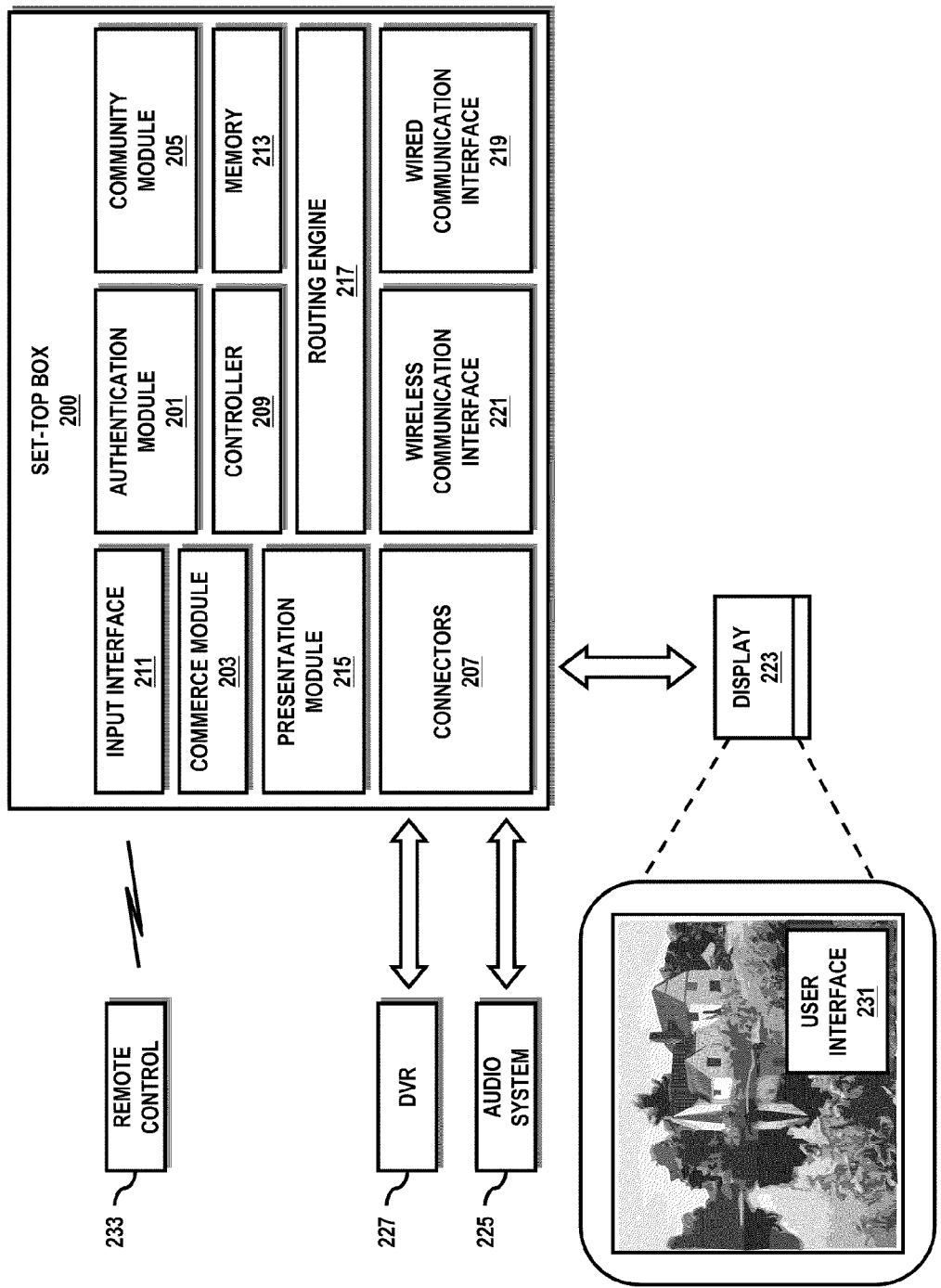
FIG. 2 is a diagram of a set-top box configured to facilitate network connectivity and consumption of broadband services, according to an exemplary embodiment.

FIG. 2 is a diagram of a set-top box configured to facilitate network connectivity and consumption of broadband services, according to an exemplary embodiment. Set-top box 200 may comprise computing hardware (such as described with respect to FIG. 14), as well as include one or more components configured to execute the processes described herein. In one implementation, set-top box 200 includes authentication module 201, commerce module 203, community module 205, connectors 207, controller (or processor) 209, input interface 211, memory 213, presentation module 215, routing engine 217, wired communication interface 219, and wireless communication interface 221. While specific reference will be made to this particular implementation, it is also contemplated that set-top box 200 may embody many forms and include multiple and/or alternative components.

In this manner, set-top box 200 may comprise suitable technology to receive one or more content streams from one or more content sources, such as IPTV system 129, as well as suitable technology for providing various levels of network connectivity to user devices 101a-101n and/or "other" set-top boxes, such as set-top boxes 103a-103n. According to one embodiment, routing engine 217 may be utilized for these purposes. That is, routing engine 217 may be utilized to process data received on "external" data network connections (or links), such as data received from service provider network 109 in association with one or more broadband services, for transmission over an "internal" data network connection, e.g., over links from set-top box 200 to one or more user devices 101a-101n or "other" set-top boxes 103a-103n. It is also noted that the converse may be true, i.e., routing engine 217 may be utilized to process data received on "internal" data network connections, e.g., data received from user devices 101a-101n or set-top boxes 103a-103n in association with one or more broadband services, for transmission over an "external" data network connection, such as over one or more of networks 105-113. As such, routing engine 217 may utilize one or more routing tables (or routing caches) stored to, for example, memory 213, for routing traffic over networks 105-113. In this manner, the routing tables of set-top box 200 may include information specifying one or more transmission paths for effectuating communications over networks 105-113. According to other embodiments, routing engine 217 filters inbound/outbound traffic based on sender/receiver addressing information and, therefore, these (or other) routing tables may include such addressing information. As such, routing engine 217 not only provides for connection of set-top box 200 to user devices 101a-101n and/or other set-top boxes 103a-103n, but also allows for connection of set-top box 200 to one or more wired access networks 105 and/or wireless access networks 107.

According to particular embodiments, routing engine 217 may also be configured to uniquely identify user devices 101a-101n and/or "other" set-top boxes 103a-103n "directly" connected to set-top box 200, such as through one or more static and/or dynamic addressing schemes. For instance, routing engine 217 may be configured to dynamically assign one or more "private" dynamic host configuration protocol (DHCP) internet protocol (IP) addresses to user devices 101a-101n and/or "other" set-top boxes 103a-103n directly connected to set-top box 200, as well as to translate between these "private" addresses and one or more "external" addresses for seamlessly providing communications over one or more of networks 105-113. It is noted that routing engine 217 may obtain configuration information, such as "external" network address and/or configuration parameter information from, for example, administrative system 127 and/or authentication and authorization system 141, for establishing "external" data network connections. Further, routing engine 217 may also be configured to provide one or more firewall functions to user devices 101a-101n and/or "other" set-top boxes 103a-103n, such as packet filtering functions.

As such, set-top box 200 may be also be configured to process content-based streams, including causing one or more components of these streams (e.g., a video component and/or an audio component) to be presented on (or at) display 223 and/or by audio system 225. According to particular embodiments, one or more of these components may be presented by (or in association with) user devices 101a-101n. Presentation of the content may include: displaying, recording, playing, rewinding, forwarding, toggling, selecting, zooming, or any other processing technique that enables users to experience content streams. For instance, set-top box 200 may provide one or more signals to display 223 (e.g., a television) so that display 223 may present (e.g., display) video content and/or audio content to a user.

Set-top box 200 may also interact with a personal video recorder (PVR), such as digital video recorder (DVR) 227, to store received signals that can then be manipulated by a user at a later point in time. In various embodiments, DVR 227 may be network-based, e.g., included as a part of service provider network 109, collocated at a subscriber site having connectivity to set-top box 200, and/or integrated into set-top box 200. A display 223 may present content provided via set-top box 200 to a user. In alternative embodiments, set-top box 200 may be configured to communicate with a number of additional peripheral devices and/or user devices 101a-101n, such as one or more of the aforementioned computing devices, mobile devices, and/or telephony devices.

User devices 101a-101n and/or the peripherals may be configured to implement instances one or more user interfaces 231 to access content stored and/or processed by set-top box 200. For example, a content stream may be received by set-top box 200 and recorded by DVR 225, wherein user device 101b may later access and view the stored content. Moreover, the peripheral devices may be configured to program or otherwise control the functions of set-top box 200. For instance, a content management function may receive input from a user specifying content that is accessible over a data network. As such, a communication interface (not illustrated) of user device 101b may be configured to retrieve the content over the data network, wherein set-top box 200 may providing routing functions for presenting the content to the user via one or more user devices 101a-101n, displays 223, audio systems 225, etc.

In another embodiment, user input to a user interface 231 executed by (or in association with) set-top box 200 may cause specified content to be made available to a community of users via community content repository 135. In this manner, community module 205 may be utilized for maintaining access rights and authentication information for such community content. It is noted that community module 205 may also be utilized to enable sharing and monitoring of sharing of data network connections associated with set-top box 200. Still further, user input to a user interface 231 may be configured to program or otherwise control the functions of set-top box to locate, specify, share, purchase, and/or transmit content to set-top box 200 for distribution to one or more user devices 101a-101n, displays 223, audio systems 225, and the like.

Furthermore, set-top box 200 may include one or more communication interfaces, such as wired communication interface 219 and wireless communication interface 221 that are configured for providing wired and/or wireless connectivity to set-top box 200 by user devices 101a-101n, "other" set-top boxes 103a-103n, suitable displays, DVRs, audio systems, and the like. Further, these communication interfaces 219 and 221 are also configured to facilitate wired and/or wireless connectivity to wired access networks 105 and wireless access networks 107. As such, communication interfaces 219 and 221 may optionally include single or multiple port interfaces. For example, set-top box 200 may establish a broadband data network connection to multiple sources transmitting content to set-top box 200 via a single port, whereas in alternative embodiments, multiple ports may be assigned to the one or more sources. The same may also be true for connections with user devices 101a-101n. In this manner, communication interfaces 219 and/or 221 may employ routing engine 217 for effectuating communications over networks 105-113 and/or in association with user devices 101a-101n.

According to various embodiments, set-top box 200 may include various inputs and outputs (e.g., connectors 207) to display 223 and DVR 227, as well as audio system 225. In particular, audio system 225 may comprise a conventional audio-video receiver capable of monaural or stereo sound, as well as multichannel surround sound. Audio system 225 may include speakers, ear buds, headphones, or any other suitable component configured for personal or public dissemination. As such, set-top box 200, display 223, DVR 227, and audio system 225, for example, may support high resolution audio and/or video streams, such as high definition television (HDTV) or digital theater systems high definition (DTS-HD) audio. Thus, set-top box 200 may be configured to encapsulate data into a proper format with required credentials before transmitting onto one or more of the networks of FIG. 1 and de-encapsulate incoming traffic to dispatch data to display 223 and/or audio system 225. This may also be true for content streams provided to one or more of user devices 101a-101n.

In an exemplary embodiment, display 223 and/or audio system 225 may be configured with internet protocol (IP) capability (i.e., includes an IP stack, or is otherwise network addressable), such that the functions of set-top box 200 may be assumed by display 223 and/or audio system 225. In this manner, an IP ready, HDTV display or DTS-HD audio system may be directly connected to one or more of networks 105-113. Although set-top box 200, display 223, DVR 227, and audio system 225 are shown separately, it is contemplated that these components may be integrated into a single component, or other combination of components.

An authentication module 201 may be provided at set-top box 200 to initiate or respond to authentication schemes of, for instance, authentication and authorization system 141 or various other content providers, e.g., broadcast television systems 131, third-party content provider systems 133, etc. Authentication module 201 may provide sufficient authentication information, e.g., a user name and password, a key access number, a unique machine identifier (e.g., MAC address), and the like, as well as combinations thereof, to a corresponding network interfaces for establishing connectivity, e.g., establishing one or more data network connections that may be shared via user devices 101a-101n and/or "other" set-top boxes 103a-103n. Moreover, authentication at set-top box 200 may identify and authenticate one or more secondary devices (e.g., user devices 101a-101n) communicatively coupled to, or associated with, set-top box 200. Further, authentication information may be stored locally at memory 213, in a repository (not shown) connected to set-top box 200, or at a remote repository, e.g., user profile repository 139, for authenticating user devices 101a-101n and/or "other" set-top boxes 103a-103n to set-top box 200.

Presentation module 215 may be configured to receive data streams (e.g., audio/video feed(s) including content retrieved from community content repository 135) and output a result via one or more connectors 207 to display 223, audio system 225, and/or one or more user devices 101a-101n. In this manner, presentation module 215 may also provide one or more user interfaces for content management, networked (or remote) commerce, sharing of data network connections, and the like, via display 223 and/or user devices 101a-101n. Aural aspects of these user interfaces may be presented via audio system 225, display 223, and/or user devices 101a-101n. In certain embodiments, user interfaces 231 may be overlaid on video content output of, for example, display 223 or user devices 101a-101n, via presentation module 215. In any case, however, the data streams may include content received in response to user input specifying one or more broadband services that are accessible over one or more of networks 105-113. Accordingly, presentation module 215 may provide a list of identifiers to the user for selection of broadband services (e.g., content) to be experienced. Exemplary identifiers may include graphical elements, channels, aural notices, or any other suitable signifier, such as a uniform resource locator (URL), phone number, serial number, registration number, MAC address, code, etc.

Connector(s) 207 may provide various physical interfaces to display 223, audio system 225, as well as other peripherals; the physical interfaces may include, for example, RJ45, RJ11, high definition multimedia interface (HDMI), optical, coax, FireWire, wireless, and universal serial bus (USB), or any other suitable connector. Presentation module 215 may also interact with a control device 233 for determining particular content that a user desires to experience, purchase, share, upload, download, etc. In an exemplary embodiment, control device 233 may comprise a remote control (or other access device having control capability, such as a computing device, wireless device, mobile phone, etc.) that provides a user with the ability to readily manipulate and dynamically change parameters affecting the broadband services provided by way of set-top box 200. In other examples, set-top box 200 may be configured for voice recognition, such that set-top box 200 may be controlled with spoken utterances.

In this manner, control device 233 may include (not shown) a cursor controller, trackball, touch screen, touch pad, keyboard, and/or a key pad for activating content management functions, navigating through broadcast channels and/or media content identifiers, as well as performing other control functions, e.g., sharing data network connections, uploading/downing content to one or more community content repositories, engaging in remote commerce, etc. Control device 233 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, control device 233 may comprise a memory (not illustrated) for storing preferences affecting the broadband services provided via set-top box 200, which can be conveyed to set-top box 200 through an input interface 211. Input interface 211 may support any type of wired and/or wireless link, e.g., infrared, radio frequency (RF), BLUETOOTH, and the like. Thus, control device 233 may store user preferences with respect to content, such as favorite sources, etc. Alternatively, user preferences may be tracked, recorded, or stored in set-top box 200 or in a network user profiles repository 139. The preferences may be automatically retrieved and activated by a user at any time. It is noted that control device 233 may be separate from set-top box 200 or may be integrated within set-top box 200 (in which case certain input interface hardware and/or software may not be necessary).

Particular embodiments enable users, via control device 233, to populate or otherwise configure a user profile. For instance, a user profile application may be provided or accessed by set-top box 200 to enable users to populate a plurality of entry fields with user information for accessing one or more broadband services of system 100. A user profile may include one or more customized or personalized settings that affect any aspect of service availability via set-top box 200. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible content sources/subjects, a "blacklist" specifying one or more content sources/subjects, as well as other equivalent customized settings, such as color schemes, sound effects, etc.

In other embodiments, the user profile may be established using one or more of user devices 101a-101n. As such, user profile information may be stored in set-top box 200, e.g., in memory 213, and/or at a user site repository (not illustrated) directly connected with set-top box 200. Additionally or alternatively, profile information may be stored in a network-based repository (e.g., remote user profile repository 139), control device 233, and/or any other storage medium. Similarly, set-top box 200 (via memory 213), a user site repository, and/or a network-based repository may store a "MY CONTENT" and/or a "COMMUNITY CONTENT" collection of digital audio, video and/or pictographic content accumulated by a user. These collections may also include a plurality of identifiers (or bookmarks) to content accessible over a data network, wherein the selection of a particular identifier may cause set-top box 200 to obtain the content from an associated data network connection (either directly from a data network source (e.g., community content repository 135) or indirectly from, for example, MSP 129.

Thus, under the arrangements of FIGS. 1 and 2, a user may experience (e.g., locate, specify, and receive), as well as share (e.g., transmit) media content including content retrieved over one or more of networks 105-113. Operations of set-top box 200 and one or more of functions 115-125, in conjunction with the components of system 100, will now be described with respect to FIGS. 3-13.

Figure 3:
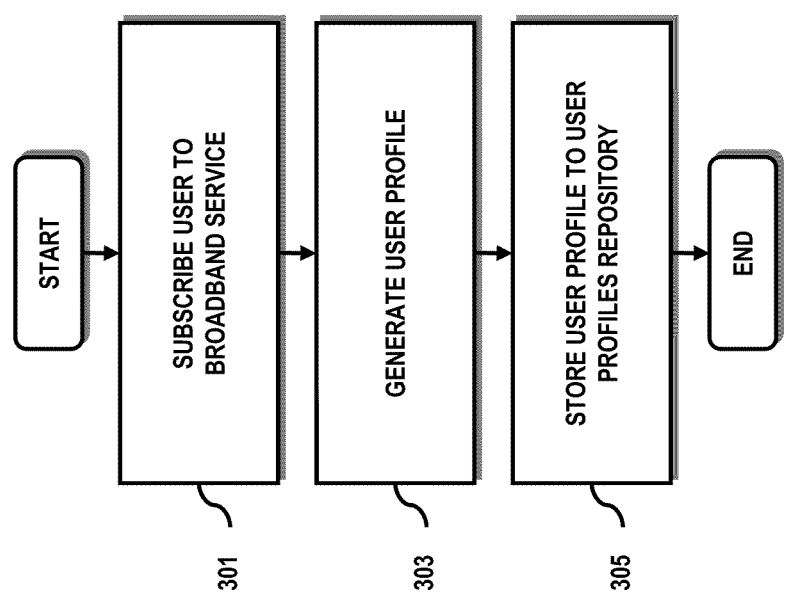
FIG. 3 is a flowchart of a process for subscribing a user to one or more broadband services, according to an exemplary embodiment.

FIG. 3 is a flowchart of a process for subscribing a user to one or more broadband services, according to an exemplary embodiment. For illustrative purposes, the process is described with respect to FIGS. 1 and 2. It is noted that the steps of the process may be performed in any suitable order, as well as combined or separated in any suitable manner. In step 301, administrative system 127 subscribes a user to the features and functions of system 100, such as one or more of the broadband data, voice, and/or video services. According to one embodiment, the user may subscribe utilizing any suitable user device and/or set-top box capable of processing and transmitting information over one or more of networks 105-113, such as set-top box 200. For instance, the user may interact with an input interface (e.g., control device 233) of, for example, set-top box 200 to activate software resident on the device. The software may then establish an IP-based connection with administrative system 127. As such, the user can register as a new subscriber and may obtain sufficient authentication information for accessing one or more of the available broadband data, voice, and/or video services of system 100. In certain embodiments, registration procedures may prompt the user to identify those user devices (e.g., user devices 101a-101n) and/or set-top boxes (e.g., set-top boxes 103a-103n) that the user may employ to interact with these services. Accordingly, registered user devices and/or set-top boxes may be logically associated with the user. Once registered (or as part of the registration process), administrative system 127 may enable the user, per step 303, to generate a user profile including, for example, username, password, other service provider account information, billing information, configuration information, etc., as well as one or more other parameters, values, variables, numbers, etc., previously described and/or other like personal information, e.g., user demographics, group/organizational affiliations, memberships, interests, etc. It is also noted that this user profile information may include addressing information associated with specified user devices, such as, for example, one or more directory addresses, electronic serial numbers, international mobile equipment identifiers, machine access control addresses, mobile directory numbers, mobile equipment identities, mobile identification numbers, internet protocol addresses, port addresses, and/or any other suitable address, as well as include other service related information, parameters, polices, variables, etc. At step 305, administrative system 127 stores the user to a list of subscribers to the broadband services of system 100, as well as stores the generated user profile, authentication information, client device addressing information, etc., to, for example, user profiles repository 139. It is noted, however, that administrative system 127 may additionally (or alternatively) store or synchronize this user profile information to any other suitable storage location and/or memory of (or accessible to) administrative system 127. Further, it is contemplated that users may directly interact with one or more of these storage locations and/or memories, such as user profiles repository 139.

Figure 4:
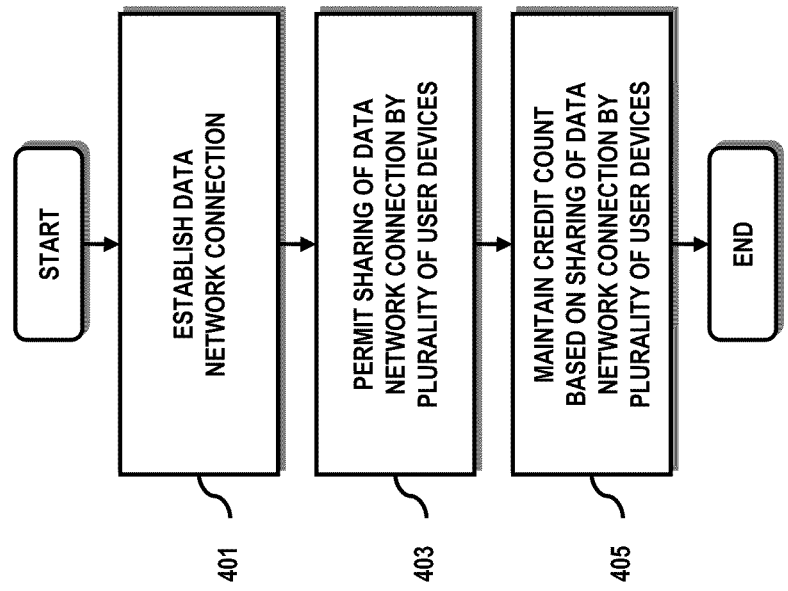
FIG. 4 is a flowchart of a process for facilitating network connectivity, according to an exemplary embodiment.

FIG. 4 is a flowchart of a process for facilitating network connectivity, according to an exemplary embodiment. For illustrative purposes, the process is described with respect to FIGS. 1 and 2. It is noted that the steps of the process may be performed in any suitable order, as well as combined or separated in any suitable manner. At step 401, set-top box 200 attempts to establish a data network connection over one or more of networks 105-113. An exemplary process for establishing data networks is described in more detail with FIG. 5. Once establish, however, set-top box 200 may permit sharing (in step 403) of the data network connection by a plurality of user devices, such as user devices 101a-101n. It is noted that an exemplary process for sharing data network connections is more fully described with FIGS. 7 and 8. Accordingly, per step 405, a credit count may be maintained based on the sharing of the data network connection by the plurality of user devices 101a-101n. As previously noted, and explained in more detail with FIG. 7, community function 117 may be configured to monitor the sharing of the data network connections, such that one or more credit counts may be maintained for the subscriber and/or subscribers associated with "visiting" user devices and "other" set-top boxes sharing the data network connection. According to certain embodiments, the credit count may be maintained based on consumption of bandwidth allotted to the subscriber and, thereby, shared with "visiting" users associated with user devices and/or set-top boxes unassociated with the subscriber account corresponding to set-top box 200. As such, the credit count may be positively incremented when "visiting" users unassociated with the subscriber account consume bandwidth allotted to the subscriber. The credit count may be negatively incremented when the subscriber utilizes bandwidth allotted to data network connections of other set-top box subscribers, or otherwise redeems credits associated with the credit count.

Figure 5:
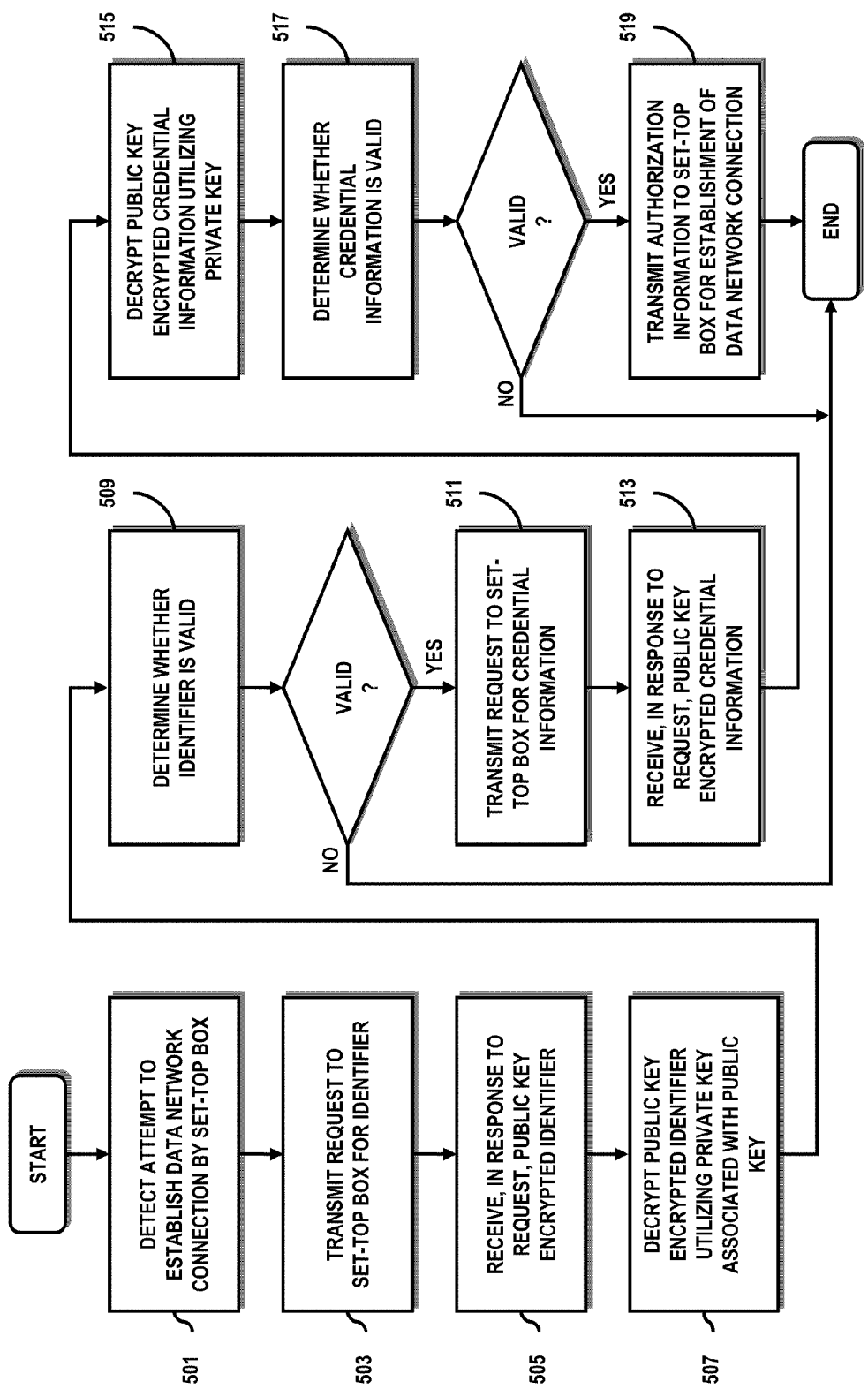
FIG. 5 is a flowchart of a process for authenticating and authorizing a set-top box for establishing a data network connection, according to an exemplary embodiment.

As previously mentioned, authentication and authorization system (or system) 141 may be configured to authenticate and authorize requested data connections by set-top boxes 103a-103n. FIG. 5 is a flowchart of a process for authenticating and authorizing a set-top box for establishment of a data network connection, according to an exemplary embodiment. For illustrative purposes, the process is described with respect to FIGS. 1 and 2. It is noted that the steps of the process may be performed in any suitable order, as well as combined or separated in any suitable manner. At step 501, system 141 detects an attempt to establish a data network connection by, for example, set-top box 103b. The data network connection may be a wired or wireless data network connection over, for instance, wired access network 105 or wireless access network 107. In this manner, system 141 may detect the attempt based on information provided from an intermediary networking node (not shown), such as an access gateway of wired access network 105 or wireless access network 107, through which the attempt is initiated. It is noted set-top box 103b, the networking node, and system 141 may communicate utilizing layer two (or data link layer) protocols, such as one or more ethernet based protocols, and, as a result, communications exchanged between these entities may conform with one or more standardized authentication-based protocols, such as an extensible authentication protocol (EAP), extensible authentication protocol for authentication and key agreement (EAP-AKA), extensible authentication protocol transport layer security (EAP-TLS), or any other suitable authentication-based protocol. As such, establishment of the data network connection may be prevented until system 141 authenticates set-top box 103b, e.g., provides set-top box 103 sufficient addressing and/or configuration information for accessing one or more of the broadband data, voice, and/or video services of system 100.

Accordingly, system 141 may initiate, in step 503, an authentication scheme by transmitting a request to set-top box 103b for sufficient identification information, such as a device identifier uniquely associated with set-top box 103b. It is noted that, in certain exemplary embodiments, set-top box 103b may unilaterally transmit a unique identifier to system 141 as part of (or ancillary to) attempting to establish the data network connection. As such, system 141 may detect the attempt to establish the data network connection based on receiving the unique identifier. In any event, system 141 receives the unique identifier associated with set-top box 103b, per step 505, which may be a CDI, EUI, GUID, MAC address, OUI, serial number, or other like identifier uniquely associated with set-top box 103. It is noted that the identifier may be public-key encrypted. As such, system 141 decrypts (in step 507) the public-key encrypted identifier utilizing a private key associated with the public key. According to exemplary embodiments, the service provider of system 100 is charged with maintaining the secrecy of the private key and, therefore, system 141 may be the only entity (or one of a select few of entities) that are privy to the private key.

At step 509, system 141 determines whether the decrypted identifier corresponds to a valid subscriber account stored to, for instance, user profiles repository 139 and, thereby, a valid set-top box associated with the subscriber account. According to certain embodiments, system 141 may query user profiles repository 139 for this purpose. If the identifier is not valid, the data network connection is rejected and the process ends, otherwise, system 141 transmits (per step 511) a request for credential information to set-top box 103b. In response thereto, system 141 receives (at step 513) credential information from set-top box 103b, which may also be public-key encrypted. It is generally noted that the credential information may be stored to set-top box 103b or dynamically generated by set-top box 103b in accordance with one or more of the aforementioned authentication-based protocols, e.g., EAP, EAP-AKA, EAP-TLS, etc. At any rate, system 141 decrypts (per step 515) the public-key encrypted credential information utilizing a private key associated with the public key. System 141 determines, per step 517, whether the decrypted credential information is valid. That is, system 141 determines whether the decrypted credential information corresponds to the decrypted set-top box identifier and is associated with the subscriber account. If the credential information is not valid, the data network connection is rejected and the process ends, otherwise, system 141 transmits (in step 519) authorization information to set-top box 103b for establishing the data network connection, such as addressing and configuration information for accessing one or more of the broadband data, voice, and/or video services of system 100.

Figure 6:
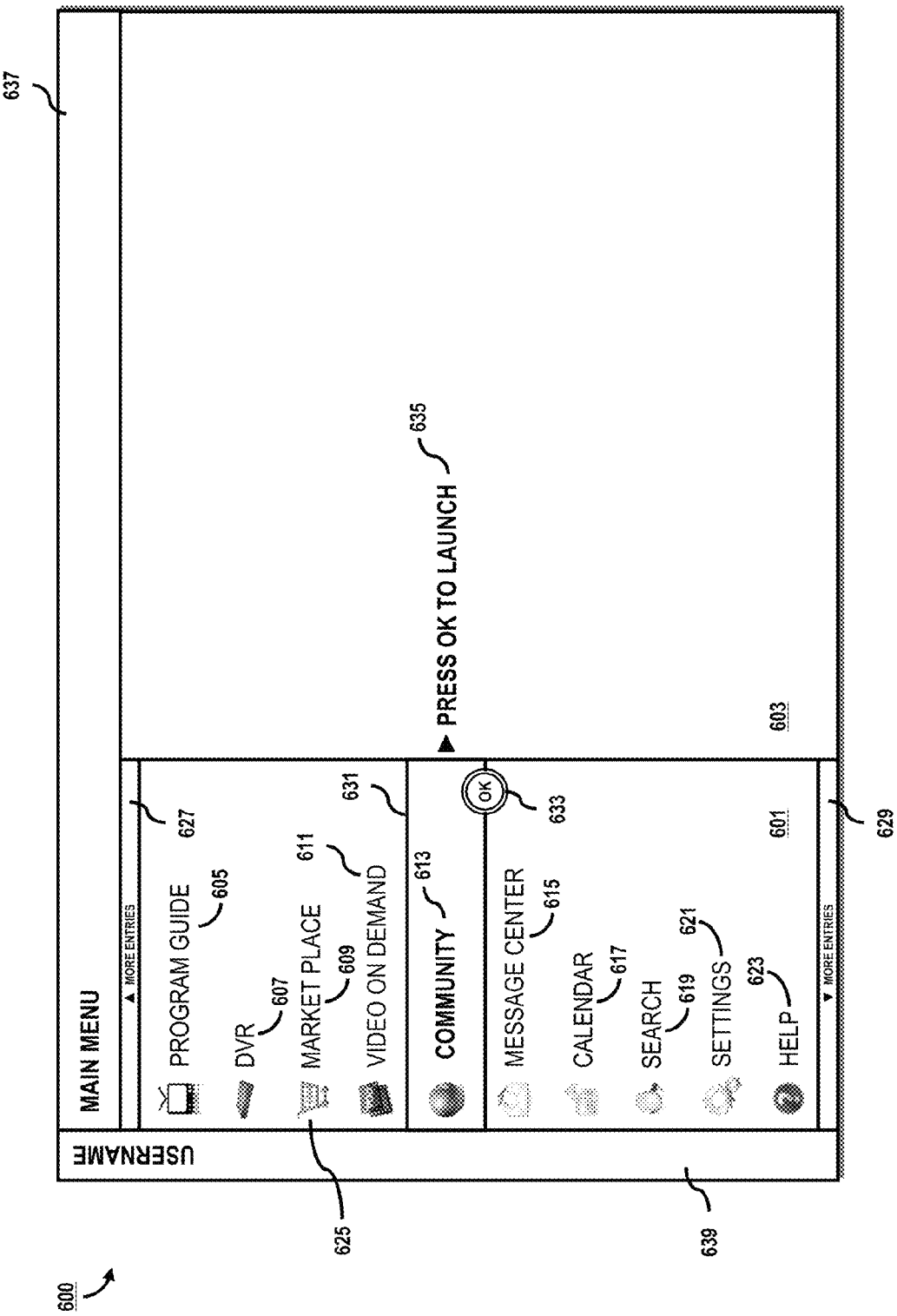
FIG. 6 is a diagram of a user interface for accessing one or more functions of a set-top box, according to an exemplary embodiment.

FIG. 6 is a diagram of a user interface for accessing one or more functions of a set-top box, according to an exemplary embodiment. User interface 600, which may function as a main menu, may be evoked using a number of different methods, such as, for example, selection of a dedicated "MENU" button on control device 233 or a peripheral device communicatively coupled thereto (e.g., a personal computer, mobile handset, etc.). It is recognized that any other suitable actuator of these devices may be additionally, or alternatively, used to access user interface 600, such as triggering a "GUIDE" icon. Further, user interface 600 may be evoked by selecting an option within another interface or application (e.g., when navigating from a public screen to a user-specific screen, i.e., a private screen). As such, an executing device (e.g., set-top box 200) may require sufficient authentication information (e.g., username and password, etc.) to be input in order to access the features and functions of user interface 600.

As shown, user interface 600, providing a "MAIN MENU," may include one or more interactive viewing panes, such as panes 601 and 603. In particular embodiments, as will be described in more detail below, the content of pane 603 may be dynamically updated to present various information related to actions conducted within pane 601, and vice versa. Pane 601 includes a listing of selectable entries corresponding to one or more features (or options) that may be provided via set-top box 200 for at least carrying out the processes described herein. For example, user interface 600 may include entries for accessing program guide features 605, digital video recorder features 607, marketplace (or shopping) features 609, on-demand programming features 611, community features 613, message center features 615, calendar features 617, searching features 619, setting features 621, help features 623, and the like. In certain embodiments, graphical elements (e.g., graphical element 625) may be provided to correspond to one or more of the entries and may be displayed therewith.

According to exemplary embodiments, user interface 600 may also include header 627 and footer 629 fields that can be configured to indicate the existence of additional entries not displayed, but navigably available. As such, users may be permitted to browse through these "other" entries via, for instance, control device 233. A fixed focus state (e.g., border 631) and/or distinctive magnification features, e.g., color, brightness, bolding, font type, text size, etc., may be used to convey a "currently" navigated position. In this manner, when a user navigates to a desired entry, actuation of, for instance, an "OK" button on control device 233 may launch corresponding features and/or applications of the particular entry. In some embodiments, an interactive "OK" option 633 may be utilized. Moreover, user interface 600 may include tooltips (such as tooltip 635) when a user navigates to a particular entry. Other embodiments may additionally (or alternatively) enable aural descriptions of entries navigated to, such that methods of interaction may be presented to a user via, for instance, audio system 225.

In certain embodiments, user interface 600 may provide navigation fields 637 and 639 to facilitate usability. For example, field 637 may provide the name of the function/option being accessed, e.g., a "MAIN MENU" function/option. It is noted that when a user accesses a new function/option, field 637 may be automatically and accordingly updated. Field 639 may be utilized to indicate a user profile (or user account) currently authenticated to (or otherwise associated with), for instance, set-top box 200, e.g., "USERNAME." Thus, a user may be permitted to access one or more features of community function 117 by navigating to and selecting (or otherwise interacting with) entry 613 of user interface 600. As such, community function 117 may be utilized to enable community access to one or more data network connections of a set-top box, upload and download content to a community repository, browse and share content stored to a memory of or associated with a set-top box or a community repository, search for content stored to a set-top box and/or available over one or more networks 105-113, and/or view credit counts associated with sharing and accessing shared data network connections of one or more set-top boxes.

Figure 7:
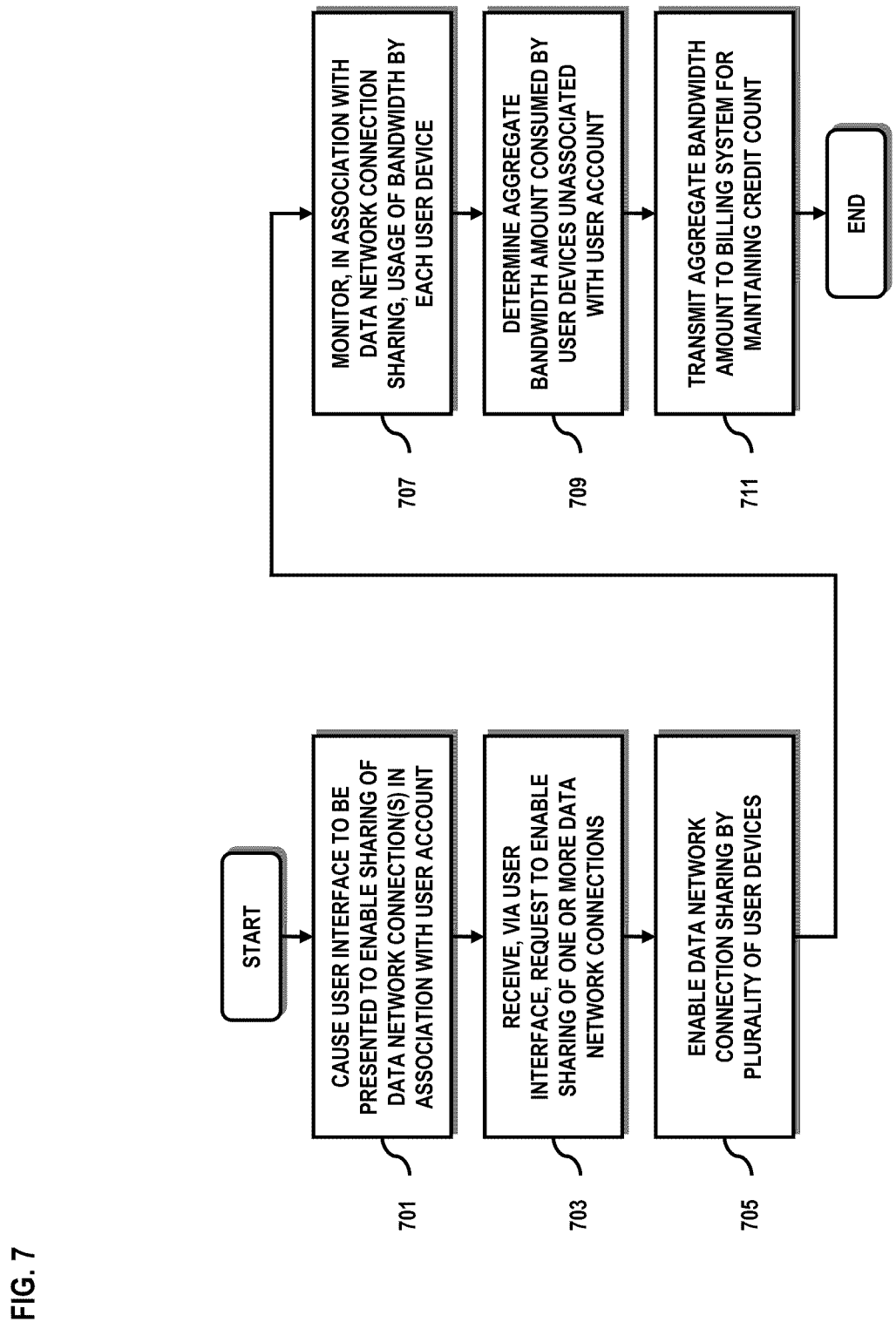
FIG. 7 is a flowchart of a process for enabling a set-top box to permit sharing of at least one data network connection, according to an exemplary embodiment.

As previously mentioned, user interface 600 enables access to various features and functions provided by community function 117, by way of community function option 613. In turn, community function 613 may provide for various features, functions, options, settings, etc., such as an ability to share one or more data network connections associated with a set-top box. FIG. 7 is a flowchart of a process for enabling a set-top box to permit sharing of a data network connection, according to an exemplary embodiment. For illustrative purposes, the process is described with reference to set-top box 200 of FIG. 2 and exemplary user interface 800 of FIG. 8. It is noted that the steps of the process may be performed in any suitable order, as well as combined or separated in any suitable manner. At step 701, set-top box 200 via, for example, presentation module 215, and one or more instructions (or computer program code) stored to memory 213 causes a user interface to be presented by, for instance, display 223 to enable sharing of one or more data network connections in association with a subscriber account associated with set-top box 200.

Figure 8:
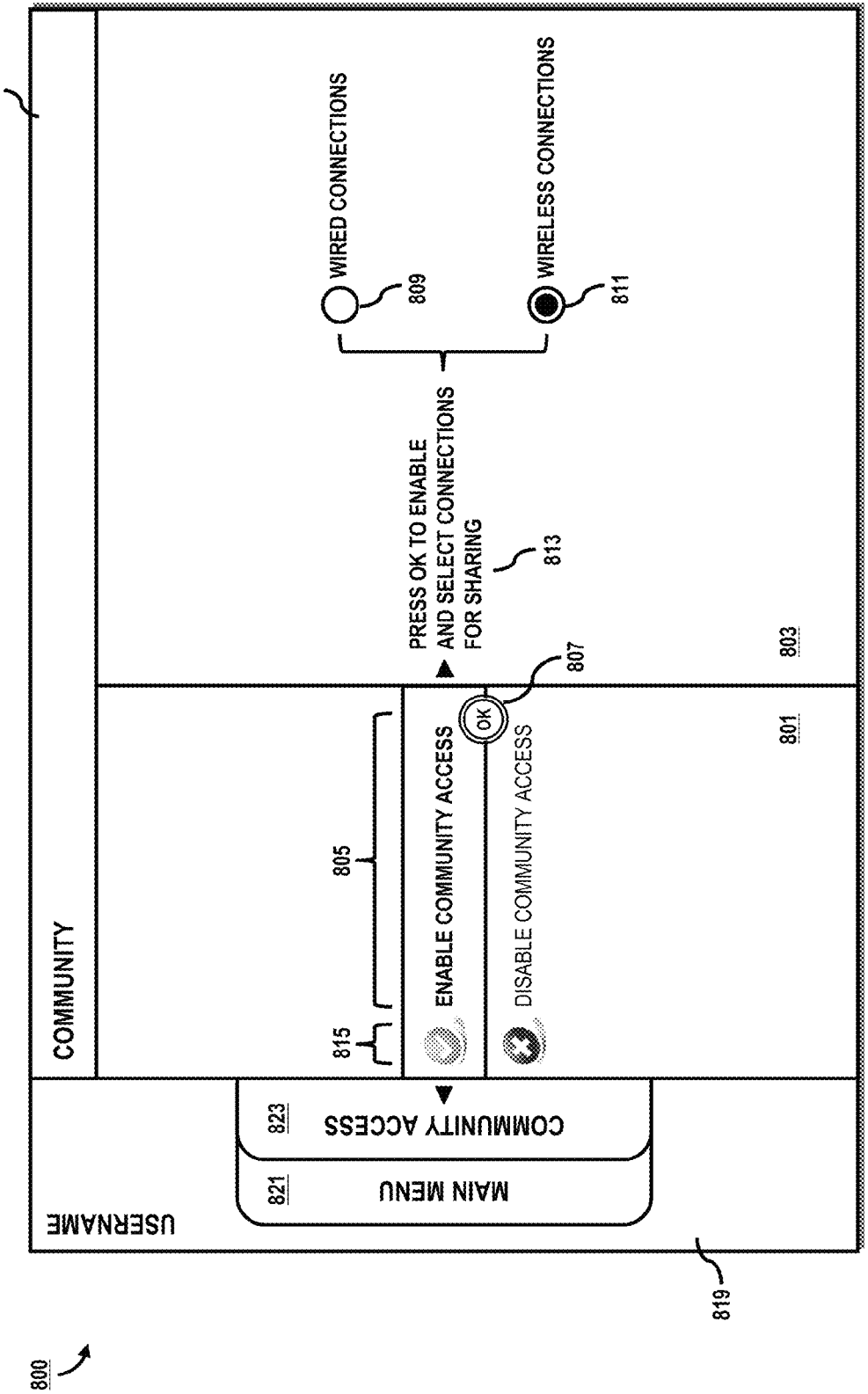
FIG. 8 is a diagram of a user interface for enabling sharing of at least one data network connection, according to an exemplary embodiment.

As seen in FIG. 8, a user may enable or disable community access to (i.e., sharing of) one or more data network connections of set-top box 200 via user interface 800. More specifically, user interface 800 may comprise panes of a community function, e.g., community function 117, implemented by, for instance, set-top box 200 in accordance with one or more instructions (or computer program code) stored to memory 213. As previously described with respect to user interface 600, user interface 800 may include one or more interactive viewing panes 801 and 803 having presentations that may be dynamically altered in response to user interaction. Pane 801 may include a list 805 of selectable entries permitting a user to enable or disable community access to one or more data network connections of set-top box 200. In other words, the entries of list 805 permit a user to either enable or disable sharing of one or more of data network connections of set-top box 200. In this manner, when a user navigates to a desired entry, actuation of, for instance, an "OK" button on control device 233 may enable or disable sharing of data network connections. Additionally (or alternatively), an interactive "OK" option 807 may be utilized. Accordingly, actions performed via viewing pane 801 may dynamically cause viewing pane 803 to provide one or more interactive interface elements (e.g., radio buttons 809 and 811) for selecting to enable or disable sharing of wired data network connections and/or wireless data network connections. Further, user interface 800 may include tooltips (such as tooltip 813) when a user navigates to a particular entry. Other embodiments may additionally (or alternatively) enable aural descriptions of entries navigated to, such that methods of interaction may be presented to a user via, for instance, audio system 225. A plurality of graphical elements 815 may be provided to correspond to one or more of the entries and may be presented therewith.

As with user interface 600, navigation fields 817 and 819 may be provided to facilitate usability. In the depicted embodiment, field 817 provides the name of the function being accessed, e.g., "COMMUNITY," whereas field 819 includes tabs 821 and 823 indicating a browsing path or thread created by the user during a particular session. Tabs 821 and 823 may be labeled and configured to be selectable so that a user can easily return to a particular function within a session history without having to restart the session. In alternative embodiments, users may navigate session histories via "BACK" and "FORWARD" buttons of, for instance, control device 233. Further, field 819 indicates a user profile of the current session, e.g., "USERNAME."

Referring back to FIG. 7, set-top box 200 may receive (per step 703) via, for instance, user interface 800, a request to enable sharing of one or more data network connections. For example, a user may navigate to "ENABLE COMMUNITY ACCESS" entry of viewing pane 801 and actuate an "OK" button on control device 233 or interact with "OK" option 807 to permit sharing of one or more of data network connections associated with set-top box 200. In this manner, the user may further interact with (e.g., select) radio button 811 to enable sharing of wireless data network connections. As such, the request may cause set-top box 200, in step 705, to enable data network connection sharing by a plurality of devices, e.g., one or more of user devices 101*a*-101*n* and/or one or more other set-top boxes (such as set-top box 103*a*). It is noted that some of these user devices or set-top boxes may be associated with a user (or subscriber) account governing these data network connections, such as user devices 101*b* and 101*c*, whereas other ones of these user devices may be "visitors" to (or otherwise unassociated with) the user account, such as user device 101*n* and set-top box 103*a*. In this manner, community function 117 may be configured to monitor, in association with the shared data network connections, consumption of bandwidth and/or any other suitable resource of set-top box 200 by each user device and/or each "other" set-top box, at step 707. In step 709, community function 117 may determine an aggregate bandwidth amount consumed by those user devices and/or "other" set-top boxes unassociated with the user account, e.g., user device 101*n* and set-top box 103*a*. This aggregate bandwidth amount may be transmitted (per step 711) to, for example, administrative system 125 (or any other suitable billing system) for maintaining a credit count associated with the user account for permitting "visiting" user devices and set-top boxes to share the data network connection(s) of set-top box 200. It is noted that the credit count enables a user associated with the user account to receive one or more incentives for allowing the user devices and "other" set-top boxes to share the data network connections, such as monetary incentives, special service-related incentives, free offers, and the like. The credit count may additionally (or alternatively) be utilized for enabling those user devices (e.g., user devices 101*b* and 101*c*) associated with the user account to share a certain or unlimited amount of bandwidth corresponding to shared data network connections of "other" set-top boxes, such as one or more shared data network connections of set-top box 101*a*.

Figure 9:
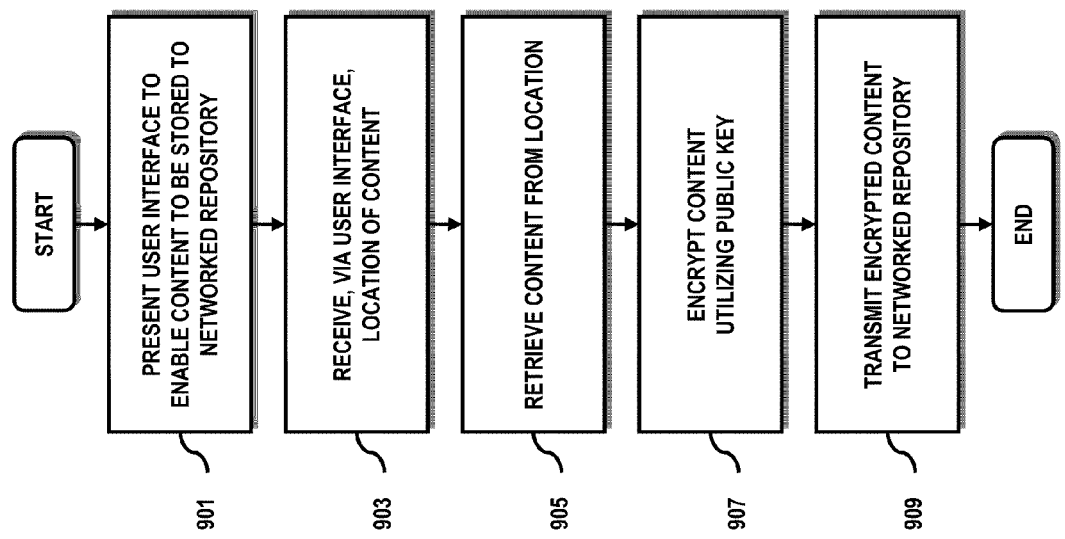
FIG. 9 is a flowchart of a process for uploading content to a networked repository, according to an exemplary embodiment.

According to other embodiments, user interface 600 enables access to one or more uploading, downloading, and content sharing features of community function 613. FIG. 9 is a flowchart of a process for uploading content to a networked repository, according to an exemplary embodiment. For illustrative purposes, the process is described with reference to set-top box 200 of FIG. 2 and exemplary user interface 1000 of FIG. 10. It is noted that the steps of the process may be performed in any suitable order, as well as combined or separated in any suitable manner. At step 901, set-top box 200 via, for example, presentation module 215, and one or more instructions (or computer program code) stored to memory 213 causes a user interface to be presented by, for instance, display 223 to enable access to one or more features of community function 613, such as an upload content feature, a download content feature, a my content feature, a search feature, and a view credit counts feature, as well as any other suitable or associated feature, such as a share content feature.

Figure 10:
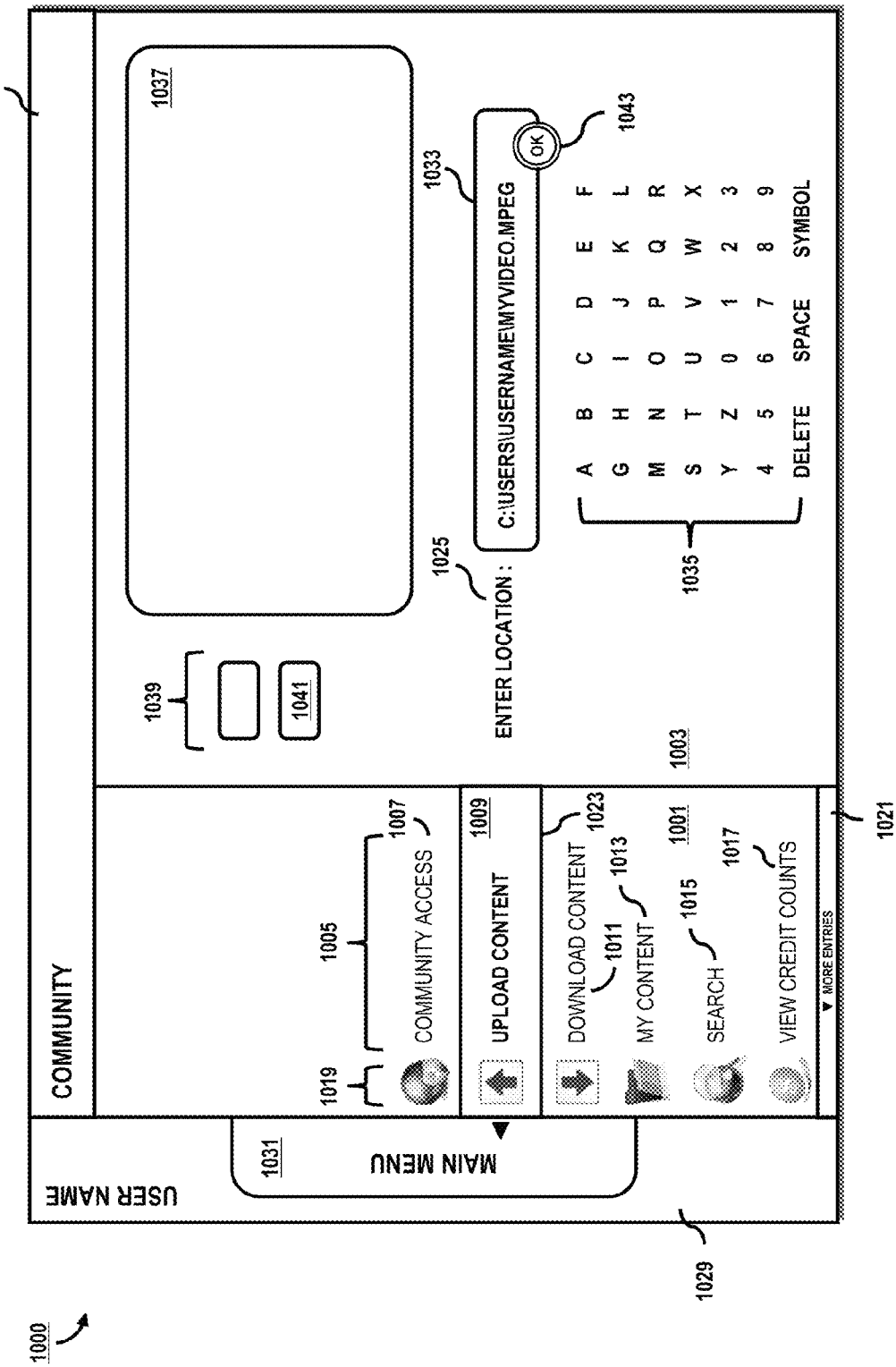
FIG. 10 is a diagram of a user interface for enabling content to be uploaded to a networked repository, according to an exemplary embodiment.

As seen in FIG. 10, a user launches "COMMUNITY" function option 613 of set-top box 200 and, as such, may be presented with user interface 1000. More specifically, user interface 1000 may comprise panes of community function 117 implemented by, for instance, set-top box 200 in accordance with one or more instructions (or computer program code) stored to memory 213. As previously described with respect to user interfaces 600 and 800, user interface 1000 may include one or more interactive viewing panes 1001 and 1003 having presentations that may be dynamically altered in response to user interaction. Pane 1001 may include a list 1005 of selectable entries permitting a user to access one or more features of communication function 115, such as "COMMUNITY ACCESS" feature 1007, "UPLOAD CONTENT" feature 1009, "DOWNLOAD CONTENT" feature 1011, "MY CONTENT" feature 1013, "SEARCH" feature 1015, and "VIEW CREDIT COUNTS" feature 1017. It is noted that features 1009 and 1011 enable users to, respectively, upload content to and download content from community content repository 135, such that feature 1015 allows users to search content stored to community content repository 135. As previously described in association with FIG. 8, feature 1007 permits users to enable or disable community access to set-top box 200, e.g., enable and disable the sharing of data network connections. Accordingly, feature 1017 provides user access to credit count information in association with the sharing of data network connections, such as "currently" earned or depleted credit counts. In certain embodiments, graphical elements 1019 may be provided to correspond to one or more of the community features, such as features 1007-1017, and may be displayed therewith.

User interface 1000 may also include also include header (not shown) and footer 1021 fields that may be configured to indicate the existence of additional features not displayed, but navigably available. As such, users may be permitted to browse to these "other" features via, for instance, control device 233. Fixed focus states, such as border 1023, and/or distinctive magnification features, e.g., color, brightness, bolding, font type, text size, etc., may be used to convey a "currently" navigated position. In this manner, when a user navigates to a desired feature, actuation of, for instance, an "OK" button on control device 233 may launch corresponding aspects of the particular feature in, for example, viewing pane 1003. Moreover, user interface 1000 may include one or more tooltips, such as tooltip 1025, when a user navigates to and/or selects a particular feature. Other embodiments may additionally (or alternatively) enable aural descriptions of features and/or tooltips, such that suitable descriptions may be presented to users via, for instance, audio system 225. It is also noted that user interface 1000 may include navigation fields 1027 and 1029 to facilitate usability. Field 1027 provides the name of the function being accessed, e.g., "COMMUNITY," whereas field 1029 includes tab 1031 indicating a browsing path or thread created by the user during a particular session. Tab 1031 may be labeled and configured to be selectable so that a user can easily return to a particular function within a session history without having to restart the session. Users may also navigate session histories via "BACK" and "FORWARD" buttons of, for instance, control device 233. Further, field 1029 may indicate a user profile of the current session, e.g., "USERNAME."

In the depicted embodiment, a user has executed "UPLOAD CONTENT" feature 1009 in order to upload content to community content repository 135. As such, viewing pane 1003 enables users to input a "current" location (or addressing information) of content to be uploaded, in box 1033 via, for instance, a key pad of control device 233 or an on-screen keyboard, such as on screen keyboard 1035. In this regard, window 1037 may be provided and configured to present listings of content and addressing information associated with that content for uploading to community content repository 135 or listings of content already uploaded to community content repository 135. Users may toggle between these listings using interactive buttons 1039. For instance, interaction with button 1041 may cause content stored to memory 213 to be displayed. As such, content from the lists may be selected and automatically input to box 1033 to facilitate input efficiencies. In this manner, when a user provides sufficient addressing information of content to be uploaded in box 1033, actuation of, for instance, an "OK" button on control device 233 may cause the specified content to be retrieved and uploaded to community content repository 135. In some embodiments, an interactive "OK" option 1043 may be utilized for this purpose.

Referring back to FIG. 9, in step 903, set-top box 200 receives via, for instance, user interface 1000, a location (or addressing information) of content to be uploaded to community content repository 135, such as, in response to, a user selecting (or otherwise interacting with) box 1033, onscreen keyboard 1035, and option 1043. As such, set-top box 200 (e.g., community module 205) retrieves (per step 905) content from the specified location, such as from a particular portion (or storage area) of memory 213. In step 907, set-top box 200 may encrypt the retrieved content utilizing an asymmetric cryptographic key, e.g., a public key, or otherwise process the content for secure transmission to community content repository 135. Accordingly, in step 909, set-top box 200 transmits the encrypted content to community content repository 135 via, for example, one or more data connections associated with wired communication interface 219 and/or wireless communication interface 221.

Figure 11:
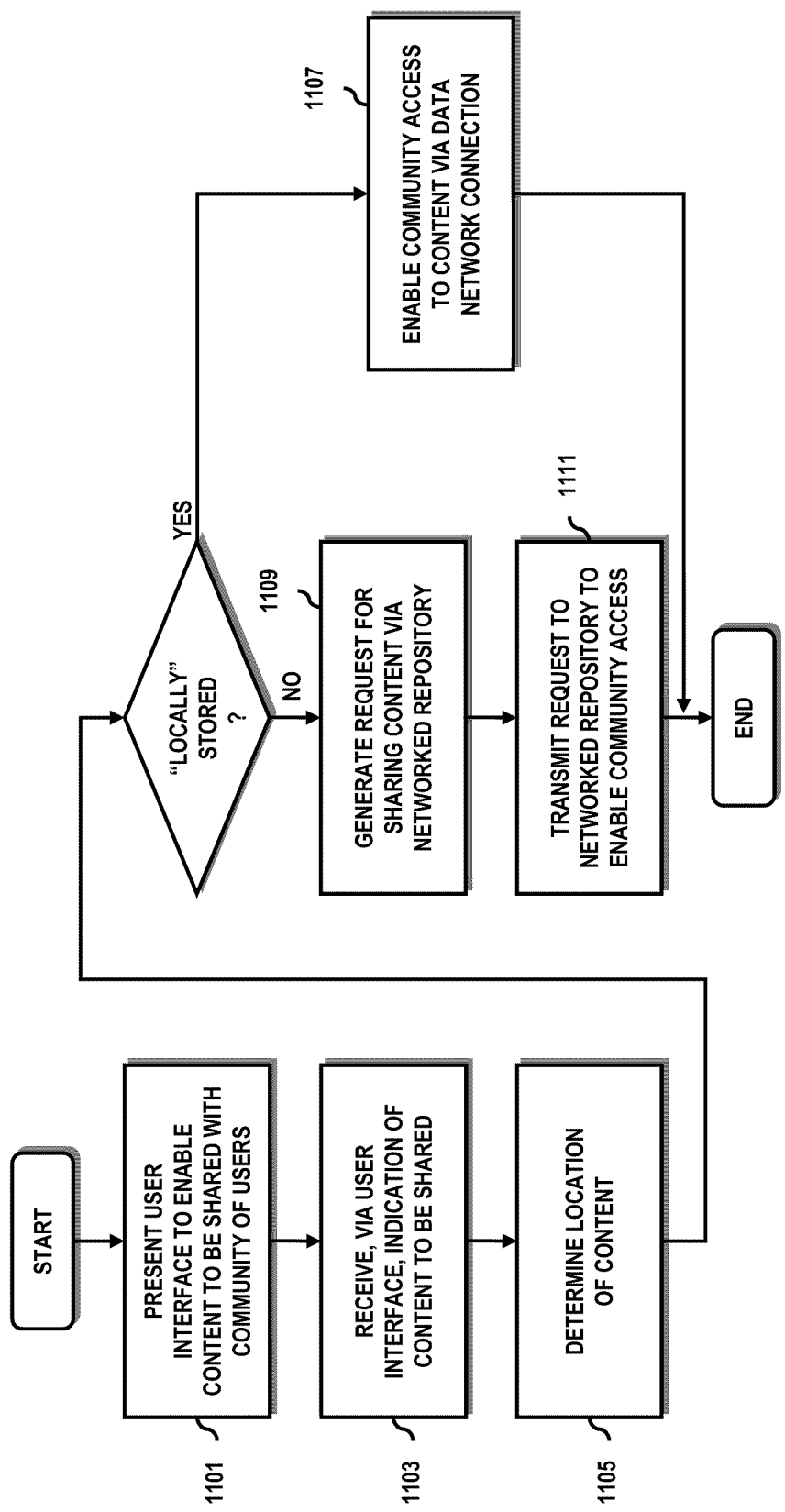
FIG. 11 is a flowchart of a process for enabling community access to content, according to an exemplary embodiment.

As previously noted, certain exemplary embodiments enable users to share content with a community of users. FIG. 11 is a flowchart of a process for enabling community access to content, according to an exemplary embodiment. For illustrative purposes, the process is described with reference to set-top box 200 of FIG. 2 and exemplary user interface 1200 of FIG. 12. It is noted that the steps of the process may be performed in any suitable order, as well as combined or separated in any suitable manner. At step 1101, set-top box 200 via, for example, presentation module 215, and one or more instructions (or computer program code) stored to memory 213 causes a user interface to be presented by, for instance, display 223 to enable and disable community access to specified content. It is noted that specified content may be stored to community content repository 135 or may be stored in association with, for example, set-top box 200, such as stored to memory 213, DVR 227, etc.

Figure 12:
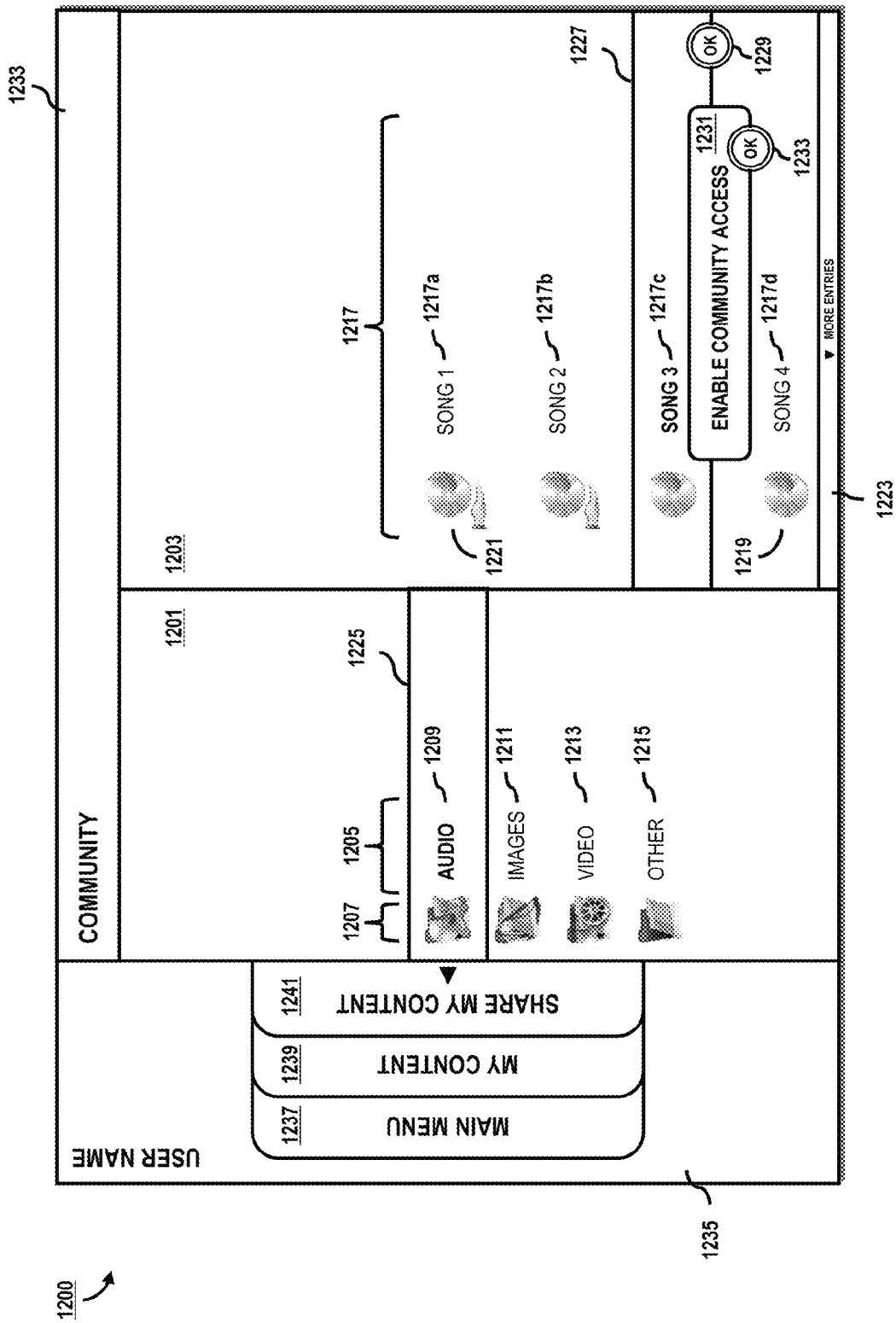
FIG. 12 is a diagram of a user interface for enabling community access to content, according to an exemplary embodiment.

As seen in FIG. 12, a user may be presented with user interface 1200 by navigating to and selecting to launch "COMMUNITY" function 613 of FIG. 6, navigating to and selecting to access "MY CONTENT" feature 1013 of FIG. 10, and, further, navigating to and selecting a browse feature for enabling and/or disabling community access to specified content. In this example, user interface 1200 may comprise panes of community function 117 implemented by, for instance, set-top box 200 in accordance with one or more instructions (or computer program code) stored to memory 213. As previously described in association with user interfaces 600, 800, and 1000, user interface 1200 may include one or more interactive viewing panes 1201 and 1203 having presentations that may be dynamically altered in response to user interaction. Pane 1201 may include a list 1205 of one or more user-defined content categories (or directories) that may be browsed for content to share with one or more communities of users. According to certain embodiments, graphical elements 1207 (e.g., stylized file folders) may be utilized to indicate further browsing capabilities, as well as one or more types of content accessible in association with a particular category/graphical element. In the depicted embodiment, list 1205 includes four user-defined content categories, e.g., "AUDIO" content category 1209, "IMAGES" content category 1211, "VIDEO" content category 1213, and "OTHER" content category 1215; however, it is contemplated that any number of user-defined categories may exist, as well as any number of subcategories. In exemplary embodiments, selection of a particular content category, may cause pane 1203 to be dynamically populated with one or more subcategories and/or one or more content instance identifiers associated with corresponding to content stored to a memory of (or associated with) set-top box 200 and, thereby, in association with the selected content category and authenticated subscriber account. For example, if a user navigates to and selects "AUDIO" content category 1209, pane 1203 may be dynamically populated with list 1217 of content instance identifiers, such as content instance identifiers 1217a-1217d, corresponding to content files stored to, for instance, memory 213 of set-top box 200 in association with content category 1209 and authenticated subscriber account "USERNAME." It is also noted that one or more graphical elements may be utilized, not only to visual convey a type of content, but also whether a particular content file has been shared with at least one community of users. For instance, graphical element 1219 may relate to an unshared audio file, whereas graphical element 1221 may relate to a shared audio file.

User interface 1200 may also include one or more header (not shown) and/or footer (e.g., footer 1223) fields that may be configured to indicate the existence of additional content categories, subcategories, and/or content instance identifiers not displayed, but navigably available. As such, users may be permitted to browse to these "other" content categories, subcategories, and/or content instance identifiers via, for instance, control device 233. Fixed focus states, such as borders 1225 and 1227, and/or distinctive magnification features, e.g., color, brightness, bolding, font type, text size, etc., may be used to convey a "currently" navigated position. In this manner, when a user navigates to a desired content category (e.g., content category 1209) and a particular content instance identifier (e.g., content instance identifier 1217c), actuation of, for instance, interactive "OK" option 1229 may execute community access feature 1231. According to certain embodiments, an "existing" shared status of the selected content file may cause community access feature 1231 to either facilitate enabling community access to "existing" unshared content files or facilitate disabling community access to "existing" shared content files. Actuation of, for example, interactive "OK" option 1233 may effectuate the corresponding enable/disable community access feature.

It is also noted that user interface 1200, like user interfaces 800 and 1000, may include navigation fields 1233 and 1235 to facilitate usability. In the depicted embodiment, field 1233 provides the name of the function being accessed, e.g., "COMMUNITY," whereas field 1235 includes tabs 1237, 1239, and 1241 indicating a browsing path or thread created by the user during a particular session. Tabs 1237-1241 may be labeled and configured to be selectable so that a user can easily return to a particular function within a session history without having to restart the session. In alternative embodiments, users may navigate session histories via "BACK" and "FORWARD" buttons of, for instance, control device 233.

Further, field 1235 may be utilized to indicate a user profile of the current, authenticated session.

Referring back to FIG. 11, set-top box 200 receives (per step 1103), an indication of content to be shared, such as user selection of a particular content instance identifier via user interface 1200, e.g., selection of content instance identifier 1217*c*. Accordingly, in step 1105, set-top box 200 may determine the location of the content associated with content instance identifier 1217*c*, such as whether the content is "locally" (e.g., stored to memory 213 of set-top box 200, a memory of a peripheral device associated with set-top box 200, or a memory of a user device connected to set-top box 200) or "remotely" (e.g., uploaded to community content repository 135). If the content is stored "locally," then set-top box 200 enables community access to the content via an established data network connection of set-top box 200, per step 1007. That is, set-top box 200 may advertise the content with system 100 as stored to set-top box 200, such that requesters of the content may obtain it by downloading the content over an established data network connection of set-top box 200. If, however, the content is "remotely" stored to, for instance, community content repository 135, then set-top box 200 may generate a request for sharing the content via community content repository 135, per step 1109. In exemplary embodiments, the request may specify the content file, associated location, and one or more commands to enable or disable community access. Accordingly, in step 1111, the request is transmitted to community access repository 135 to effectuate the command(s) of the request and, thereby, enable or disable community access to the specified content.

Figure 13:
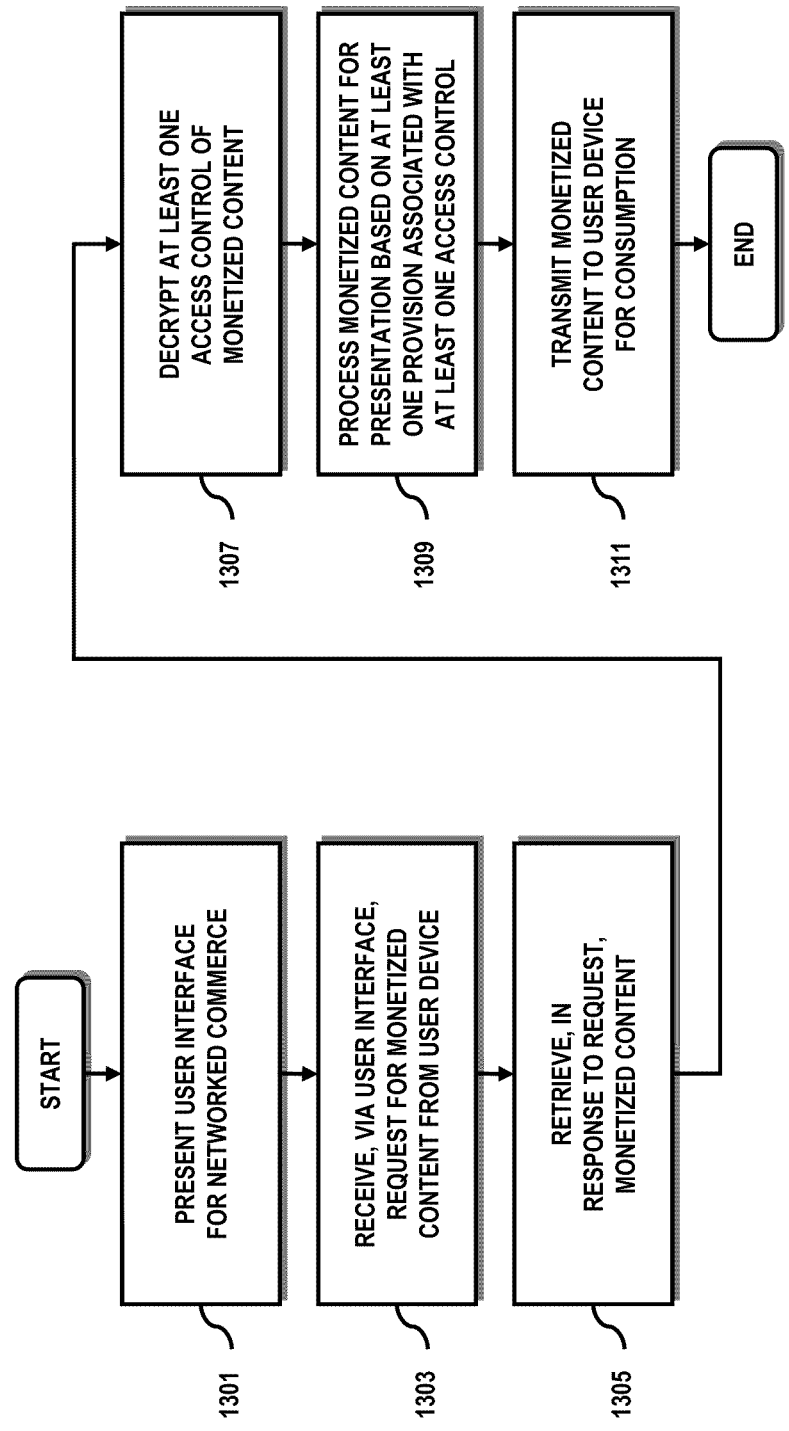
FIG. 13 is a flowchart of a process for providing remote commerce via a set-top box, according to an exemplary embodiment.

According to other embodiments, user interface 600 enables access to one or more marketplace (or networked commerce) features. FIG. 13 is a flowchart of a process for providing networked commerce via a set-top box, according to an exemplary embodiment. For illustrative purposes, the process is described with reference to set-top box 200 of FIG. 2. It is noted that the steps of the process may be performed in any suitable order, as well as combined or separated in any suitable manner. At step 1301, set-top box 200 via, for example, presentation module 215, and one or more instructions (or computer program code) stored to memory 213 causes a user interface to be presented by, for instance, a suitable presentation interface (e.g., display) of a user device, such as user device 101*b*. In this manner, the user interface may be configured to enable user device 101*b* to access one or more networked commerce features of system 100 made available by way of set-top box 200. In exemplary embodiments, the user interface may be accessed via execution of "MARKETPLACE" function 609 of FIG. 6. As such, a user associated with user device 101*b* may be presented with at least one user interface embodying a "shopping portal" that enables the user to browse, search, and/or purchase available merchandise, such as monetized content. This monetized content may be associated with a service provider of the broadband data, voice, and/or video services of system 100, a third-party content provider, and/or subscribers of the broadband data, voice, and/or video services of system 100. As such, set-top box 200 via, the user interface, may receive a request for selected monetized content from user device 101*b*, per step 1303. At step 1305, the specified monetized content may be retrieved, in response to the request. According to exemplary embodiments, the monetized content may include or may be encoded with one or more access controls, such as one or more digital right management policies. In step 1307, set-top box 200 via, for instance, presentation module 215, may decrypt at least one access control of the retrieved monetized content. Presentation module 215 may also process the monetized content, per step 1309, for presentation based on at least one provision associated with the at least one access control. Thus, in step 1311, presentation module 215 via, for example, routing engine 217 and at least one of wired communication interface 219 or wireless communication interface 221, may transmit (e.g., stream) the monetized content to user device 101*b* for consumption.

The processes described herein to facilitate network connectivity and consumption of broadband services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
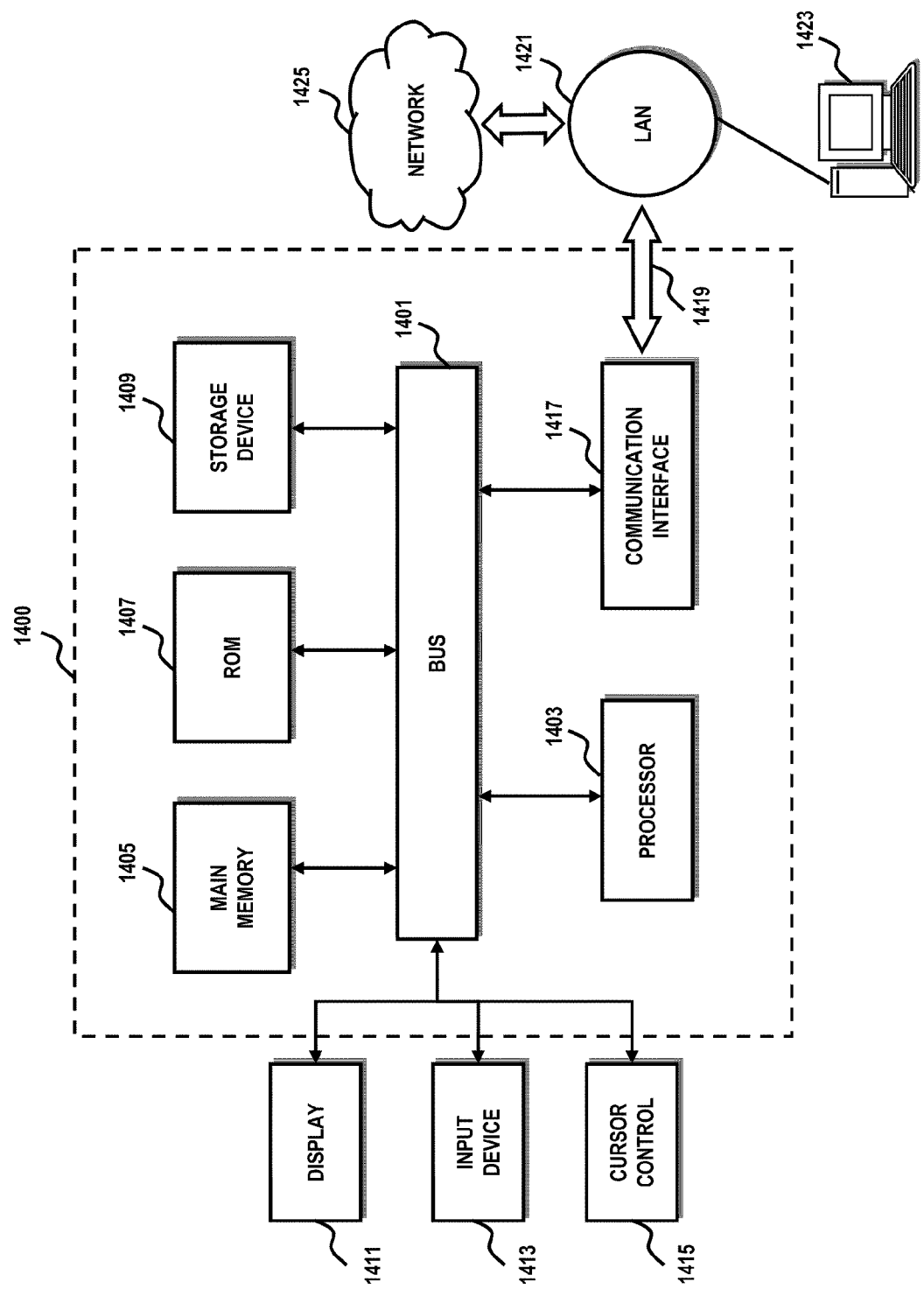
FIG. 14 is a diagram of a computer system that can be used to implement various exemplary embodiments.

FIG. 14 illustrates computing hardware (e.g., computer system) 1400 upon which exemplary embodiments can be implemented. The computer system 1400 includes a bus 1401 or other communication mechanism for communicating information and a processor 1403 coupled to the bus 1401 for processing information. The computer system 1400 also includes main memory 1405, such as a random access memory (RAM) or other dynamic storage device, coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a cathode ray tube (CRT), liquid crystal display, active matrix display, or plasma display, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411.

According to an exemplary embodiment, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement exemplary embodiments. Thus, exemplary embodiments are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, a telephone modem, or any other communication interface to provide a data communication connection to a corresponding type of communication line. As another example, communication interface 1417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a PCMCIA (Personal Computer Memory Card International Association) interface, etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 (e.g. a wide area network (WAN) or the global packet data communication network now commonly referred to as the "Internet") or to data equipment operated by a service provider. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an exemplary embodiment through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 1409. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    establishing, by a set-top box, a data network connection; and
    permitting, by the set-top box, sharing of the data network connection by a plurality of user devices, the plurality of user devices including at least one user device unassociated with a subscriber account,
    wherein a credit count associated with the subscriber account is maintained based on the sharing of the data network connection by the plurality of user devices, wherein the credit count is incremented based on the sharing of the data network connection with users unassociated with the subscriber account, and negatively incremented based on a usage by at least one user device of the plurality of user devices associated with the subscriber account.

2. A method according to claim 1, further comprising:
    separately monitoring, in association with the sharing of the data network connection, usage of bandwidth by each of the plurality of user devices,
    wherein the credit count is further maintained based on the usage.

3. A method according to claim 1, further comprising:
    receiving, by the set-top box, content for storage at a networked repository of a service provider; and
    uploading the content to the networked repository,
    wherein the content is trusted by the networked repository based on being received from the set-top box.

4. A method according to claim 3, wherein the content is accessible to a community of users via the networked repository.

5. A method according to claim 1, further comprising:
    causing, by the set-top box, a user interface for networked commerce to be presented;
    receiving, via the user interface, a request for monetized content from a user device;
    retrieving, in response to the request, the monetized content; and processing the monetized content for presentation.

6. A method according to claim 5, wherein the monetized content is retrieved via the data network connection.

7. A method according to claim 5, wherein the monetized content is encrypted with at least one access control, the method further comprising:
   decrypting the at least one access control to enable the user device to present the monetized content based on at least one provision associated with the at least one access control.

8. A method according to claim 1, wherein the plurality of user devices establish connectivity with the set-top box either via a wired interface or a wireless interface.

9. A set-top box comprising:
   at least one processor; and
   at least one memory including computer program code, the at least one memory and the computer program code configured, with the at least one processor, to cause the set-top box at least to:
      establish a data network connection, and
      permit sharing of the data network connection by a plurality of user devices, the plurality of user devices including at least one user device unassociated with a subscriber account,
   wherein a credit count associated with the subscriber account is maintained based on the sharing of the data network connection by the plurality of user devices, wherein the credit count is incremented based on the sharing of the data network connection with users unassociated with the subscriber account, and negatively incremented based on a usage by at least one user device of the plurality of user devices associated with the subscriber account.

10. A set-top box according to claim 9, wherein the at least one memory and the computer program code are further configured, with the at least one processor, to cause the set-top box at least to:
    separately monitor, in association with the sharing of the data network connection, usage of bandwidth by each of the plurality of user devices,
    wherein the credit count is further maintained based on the usage.

11. A set-top box according to claim 9, wherein the at least one memory and the computer program code are further configured, with the at least one processor, to cause the set-top box at least to:
    receive content for storage at a networked repository of a service provider; and
    upload the content to the networked repository,
    wherein the content is trusted by the network repository based on being received from the set-top box.

12. A set-top box according to claim 11, wherein the content is accessible to a community of users via the networked repository.

13. A set-top box according to claim 9, wherein the at least one memory and the computer program code are further configured, with the at least one processor, to cause the set-top box at least to:
    cause a user interface for networked commerce to be presented;
    receive, via the user interface, a request for monetized content from a user device;
    retrieve, in response to the request, the monetized content; and
    process the monetized content for presentation.

14. A set-top box according to claim 13, wherein the monetized content is retrieved via the data network connection.

15. A set-top box according to claim 13, wherein the monetized content is encrypted with at least one access control and the at least one memory and the computer program code are further configured, with the at least one processor, to cause the set-top box at least to:
    decrypt the at least one access control to enable the user device to present the monetized content based on at least one provision associated with the at least one access control.

16. A set-top box according to claim 9, wherein the data network connection is a wired data network connection or a wireless data network connection.

17. A method according to claim 1, further comprising:
    establishing, by another set-top box, another data network connection to a user device associated with the credit count, wherein the credit count is further maintained based on usage of the another data network connection by the user device.

18. A set-top box according to claim 9, wherein the at least one memory and the computer program code are further configured, with the at least one processor, to cause the set-top box at least to:
    establish, by another set-top box, another data network connection to a user device associated with the credit count, wherein the credit count is further maintained based on usage of the another data network connection by the user device.

* * * * *